US012619958B2

(12) United States Patent
Hoffman et al.

(10) Patent No.: US 12,619,958 B2
(45) Date of Patent: May 5, 2026

(54) METHOD AND SYSTEM FOR IMPLEMENTING AN ELECTRONIC EXCHANGE FOR BILL PAY AND OTHER TRANSACTIONS VIA AN INTERBANK INFORMATION NETWORK (IIN)

(71) Applicant: JPMorgan Chase Bank, N.A., New York, NY (US)

(72) Inventors: Steve Hoffman, North Aurora, IL (US); Sejdo Radoncic, Bronx, NY (US); Tiffany Ashley Wan, Brooklyn, NY (US); Amy M Leslie, Ann Arbor, MI (US); John L Biloz, Wonder Lake, IL (US); Raghvendra Singh, Brooklyn, NY (US); Maria Adele Ressa, New York, NY (US); Zachary Chestnut, Brooklyn, NY (US); Thomas Eapen, Jersey City, NJ (US); Ruwayd Dodin, New York, NY (US); Amanda Preston, Chicago, IL (US); Ganesh Raut, Jersey City, NJ (US); Josephine Lanning, London (GB); Kimberly Yang, Rochester Hillls, MI (US); Shriya Kommuri, New York, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 51 days.

(21) Appl. No.: 18/602,662

(22) Filed: Mar. 12, 2024

(65) Prior Publication Data

US 2024/0211899 A1 Jun. 27, 2024

Related U.S. Application Data

(63) Continuation-in-part of application No. 16/887,031, filed on May 29, 2020, now abandoned.

(Continued)

(51) Int. Cl.
*G06Q 20/04* (2012.01)
*G06Q 20/02* (2012.01)
(Continued)

(52) U.S. Cl.
CPC ......... *G06Q 20/042* (2013.01); *G06Q 20/023* (2013.01); *G06Q 20/102* (2013.01); *G06Q 20/389* (2013.01); *G06Q 2220/00* (2013.01)

(58) Field of Classification Search
None
See application file for complete search history.

(56) References Cited

U.S. PATENT DOCUMENTS

| | | | |
|---|---|---|---|
| 7,996,317 B1 * | 8/2011 | Gurz ...................... | G06Q 40/00 455/406 |
| 8,626,661 B2 * | 1/2014 | Gilder ................... | G06Q 20/40 705/44 |

(Continued)

OTHER PUBLICATIONS

Office Action dated Apr. 1, 2025 and issued in Canadian patent application No. 3,081,851.

*Primary Examiner* — Christopher Bridges
(74) *Attorney, Agent, or Firm* — Greenblum & Bernstein, P.L.C.

(57) ABSTRACT

The invention relates to an exchange for paper check transactions via an interbank information network (IIN) architecture. An embodiment of the present invention provides a marketplace for secure collection, assignment and distribution of payments and data from paper check transaction originators to lockbox providers. This eliminates paper checks, resulting in faster deposit into client accounts, better management of payment exceptions, and reduction in overall operating costs. The IIN architecture provides a global platform using blockchain technology for real-time interconnected flow of information that address immediate pain points across the financial industry and enable new services.

(Continued)

With an embodiment of the present invention, a distributed network may streamline process for resolving compliance based inquiries and provide global beneficiary account validations. An embodiment of the present invention provides a platform/ecosystem that network participants may use to deliver value-added service applications to other network participants.

20 Claims, 14 Drawing Sheets

Related U.S. Application Data

(60) Provisional application No. 62/854,567, filed on May 30, 2019.

(51) Int. Cl.
    *G06Q 20/10*           (2012.01)
    *G06Q 20/38*           (2012.01)

(56) References Cited

U.S. PATENT DOCUMENTS

| | | | | |
|---|---|---|---|---|
| 10,410,191 | B2 * | 9/2019 | Ceribelli .............. | G06Q 20/042 |
| 2009/0060314 | A1 * | 3/2009 | Price .................... | G06Q 20/042 |
| | | | | 382/137 |
| 2013/0066775 | A1 * | 3/2013 | Milam ................. | G06Q 20/042 |
| | | | | 705/40 |
| 2019/0026577 | A1 * | 1/2019 | Hall ..................... | G06V 30/413 |

* cited by examiner

Figure 14

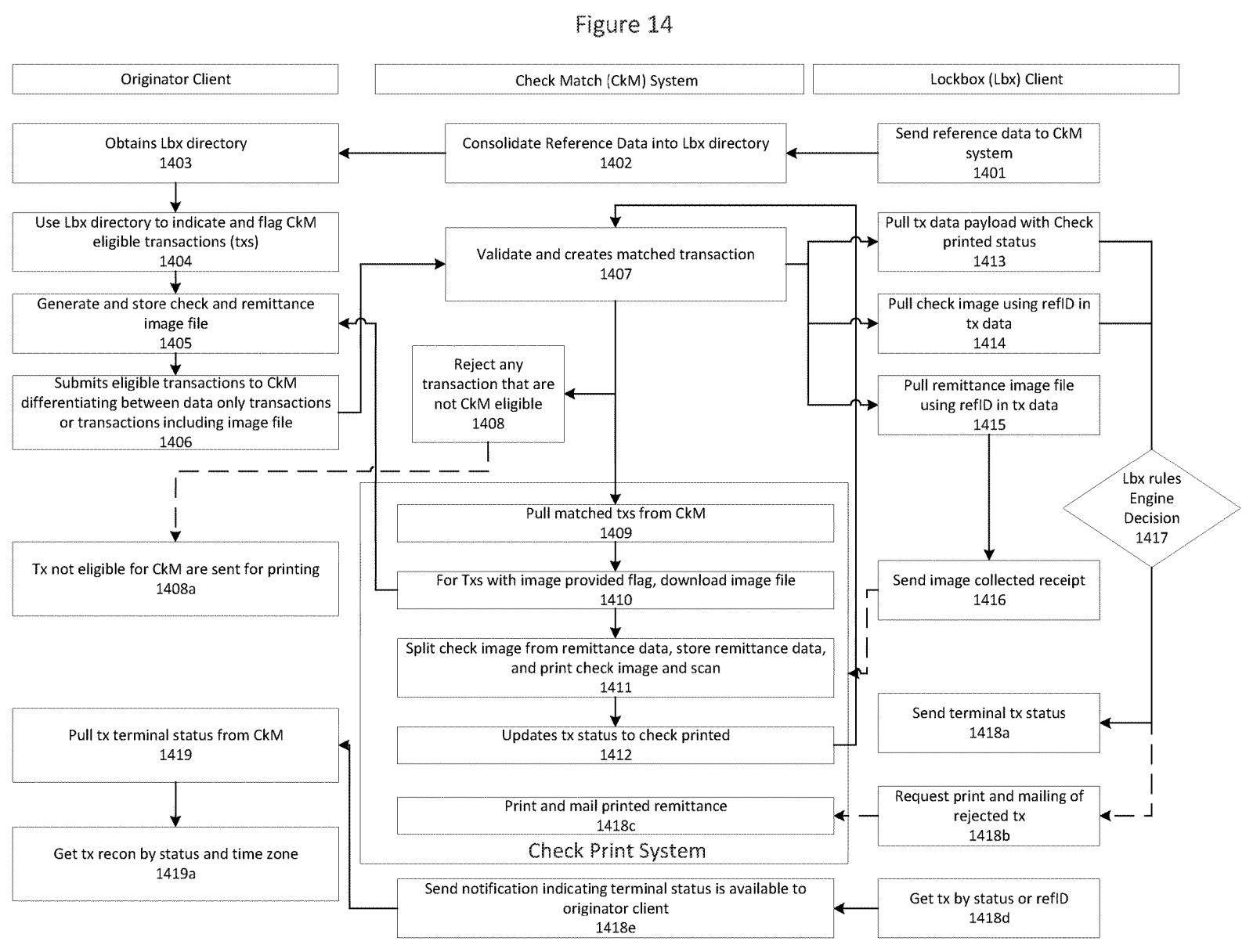

Lockbox (Lbx) Client

Check Match (CkM) System

Originator Client

Send reference data to CkM system
1401

Pull tx data payload with Check printed status
1413

Pull check image using refID in tx data
1414

Pull remittance image file using refID in tx data
1415

Send image collected receipt
1416

Send terminal tx status
1418a

Request print and mailing of rejected tx
1418b

Get tx by status or refID
1418d

Lbx rules Engine Decision
1417

Consolidate Reference Data into Lbx directory
1402

Validate and creates matched transaction
1407

Reject any transaction that are not CkM eligible
1408

Pull matched txs from CkM
1409

For Txs with image provided flag, download image file
1410

Split check image from remittance data, store remittance data, and print check image and scan
1411

Updates tx status to check printed
1412

Print and mail printed remittance
1418c

Check Print System

Send notification indicating terminal status is available to originator client
1418e Obtains Lbx directory
1403

Use Lbx directory to indicate and flag CkM eligible transactions (txs)
1404

Generate and store check and remittance image file
1405

Submits eligible transactions to CkM differentiating between data only transactions or transactions including image file
1406

Tx not eligible for CkM are sent for printing
1408a

Pull tx terminal status from CkM
1419

Get tx recon by status and time zone
1419a

METHOD AND SYSTEM FOR IMPLEMENTING AN ELECTRONIC EXCHANGE FOR BILL PAY AND OTHER TRANSACTIONS VIA AN INTERBANK INFORMATION NETWORK (IIN)

CROSS-REFERENCE TO RELATED APPLICATIONS

This application is a Continuation-in-part of U.S. patent application Ser. No. 16/887,031, filed on May 29, 2020, which claims priority to U.S. Provisional Patent Application No. 62/854,567, filed May 30, 2019. The disclosure of each of these documents, including the specification, drawings, and claims, is incorporated herein by reference in its entirety.

TECHNICAL FIELD

The invention relates generally to a method and system for implementing an electronic or digital exchange via an interbank information network (IIN) for bill pay transactions destined for paper lockboxes and other checks originated from large check origination providers.

BACKGROUND

The developments described in this section are known to the inventors. However, unless otherwise indicated, it should not be assumed that any of the developments described in this section qualify as prior art merely by virtue of their inclusion in this section, or that those developments are known to a person of ordinary skill in the art.

Each year, tens of millions of bill pay or paper check transactions start out as a digital payment transaction, but turn into a check that is mailed from a bank and commercial bill payers out to billers. These billers receive their checks via an in-house lockbox or one operated by banks or third party providers. Bill pay providers and check origination providers send millions of physical checks each year to lockboxes across the industry. This transaction costs the billers and the industry 10 times more than if the payment were routed electronically. In addition, this process generates a delay in deposit into client accounts and additional operational costs for both bill pay providers or check originators and lockbox providers (e.g., postage fees, sorting and processing of paper checks, etc.). Because there are several root causes to why a bill pay transaction turns into a check, this problem is not going away anytime soon. Current solutions require clients to adopt and make changes to their back office systems. However, these solutions involve extensive time and resources for industry participants.

Conventional checks for processing by financial institutions require printing with specialized ink or toner (e.g., Magnetic Ink Character Recognition (MICR) ink or toner). A check that is printed with regular (e.g., non-MICR) ink or toner, a financial institution may be unable to process using its conventional readers or sorters. Moreover, at least since checks may conventionally be processed via one or more sorters, American National Standards Institute (ANSI) compliant (e.g., at least 20-pound long grain with paper moisture content being between 4.7 to 5.5%) printing paper may be required to avoid faulty printing or damaging checks during conventional processing.

Moreover, presently, there are billions of paper check transactions exchanged in the United States on a yearly basis, which cause significant costs on the industry and participants to the transactions. Costs may include operational costs and security risks to the check originator and the lockbox provider. Paper checks may be subject to fraud and physical conveyance is at the mercy of any physical disruption (e.g., environmental or human-caused), thus posing potential delays and risks to the payment cycle of the parties involved in the transaction. These and other drawbacks currently exist.

SUMMARY

According to one embodiment, the invention relates to a system for implementing an electronic exchange via an interbank information network (IIN) architecture for check transactions and associated remittance information. The system comprises: a first electronic input in communication with a check originator platform associated with one or more payors; a second electronic input in communication with a lockbox platform associated with one or more lockbox service providers; and a computer processor, coupled to the first electronic input and the second electronic input, the computer processor executing an IIN application and is further configured to perform the steps of: receiving, via the first electronic input, data elements from the check originator platform; receiving, via the second electronic input, reference data elements from the lockbox platform; comparing, via the computer processor, the data elements and the reference data elements to identify one or more participants; identifying, via the computer processor, a first set of transactions that require a check print and a second set of transactions that require processing through an IIN; transmitting, via the computer processor, a corresponding payment file for the second set of transactions to a centralized lockbox deposit account; and transmitting, via the computer processor, a lockbox file to the one or more participants via the lockbox platform.

According to another embodiment, the invention relates to a method for implementing an electronic exchange via an IIN architecture for check transactions and associated remittance information. The method comprises the steps of: receiving, via a first electronic input, data elements from a check originator platform, wherein the first electronic input is in communication with the check originator platform associated with one or more payors; receiving, via a second electronic input, reference data elements from a lockbox platform, wherein the second electronic input is in communication with the lockbox platform associated with one or more lockbox service providers; comparing, via a computer processor, the data elements and the reference data elements to identify one or more participants, wherein the computer processor is coupled to the first electronic input and the second electronic input and executes an IIN application; identifying, via the computer processor, a first set of transactions that require a check print and a second set of transactions that require processing through an IIN; transmitting, via the computer processor, a corresponding payment file for the second set of transactions to a centralized lockbox deposit account; and transmitting, via the computer processor, a lockbox file to the one or more participants via the lockbox platform.

A method of an embodiment of the present invention may be conducted on a specially programmed computer system comprising one or more computer processors, mobile devices, electronic storage devices, and networks.

The computer implemented system, method and medium described herein can provide the advantages of improved bill pay processing. The various embodiments of the present invention achieve benefits and advantages for customers as well as financial institutions and lockbox operators. An embodiment of the present invention is directed to leveraging an IIN to transform lockbox operations into digital transactions. As a result, checks that are currently being printed, mailed, received, opened, extracted, data captured and reconciled manually would be eliminated or substantially minimized. The digital check lockbox platform of an embodiment of the present invention improves timeliness of clients getting paid for services and significantly decreases costs of paper, postage and processing time. In addition, billers, namely lockbox clients, do not have to change their systems or sign up for a lockbox processing service. Moreover, the digital check lockbox platform does not require end user clients to sign up for or opt in to a cost reducing offering. The digital check lockbox platform further improves quality, avoids manual mistakes and improves rates of reconciliation.

A system of an embodiment of the present invention includes a novel method of printing checks on regular paper (e.g., non-ANSI conforming) with regular ink (e.g., carbon black), and scan them to create a digital image of said check for digital processing or conveyance of the printed check.

These and other advantages will be described more fully in the following detailed description.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

FIG. 14 is an exemplary system flow diagram illustrating a method for performing a digital transmission of a paper check and associated remittance information with exception handling, according to an embodiment of the present invention.

DETAILED DESCRIPTION

Figure 1:
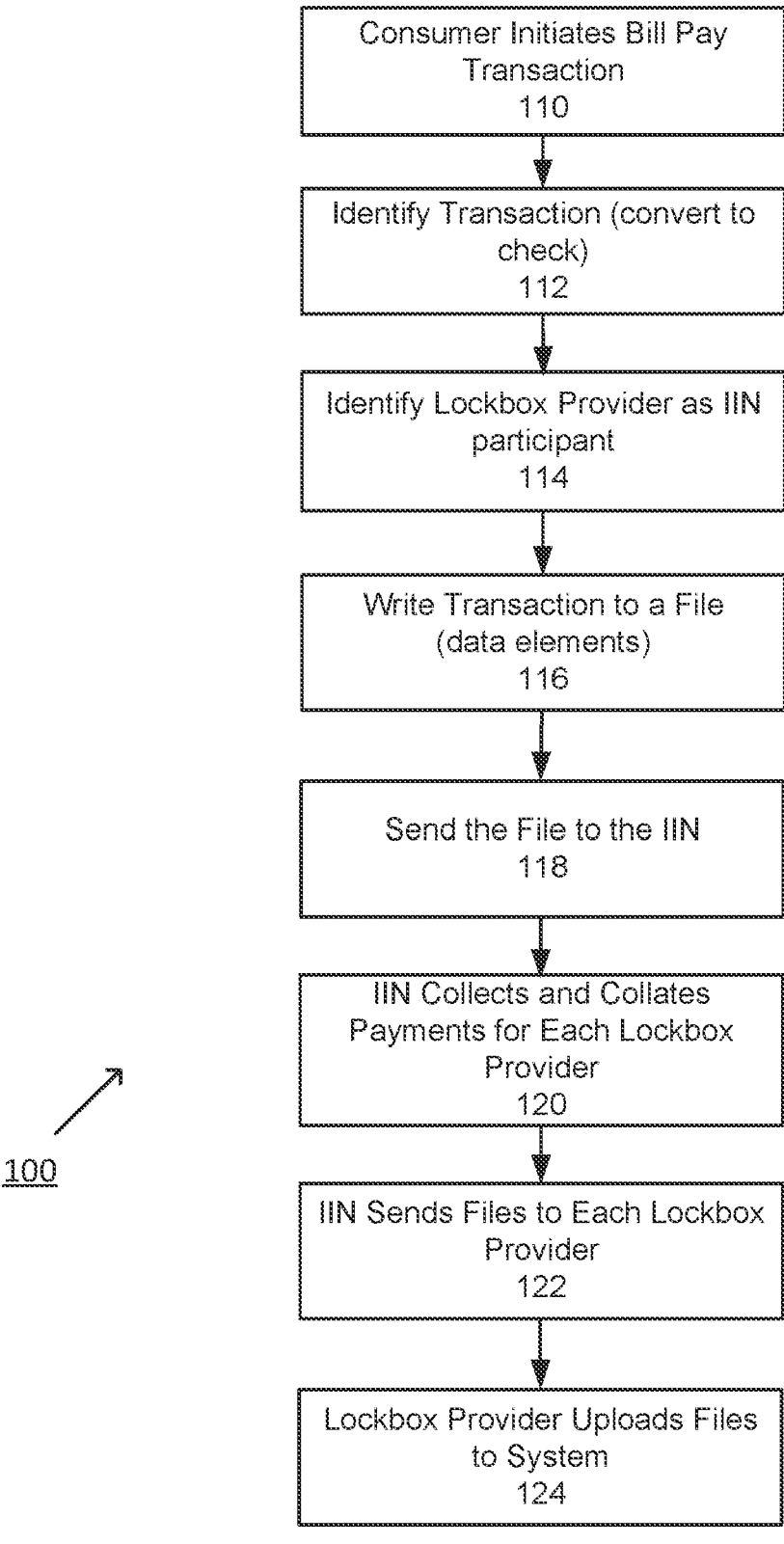
FIG. 1 is an exemplary flow illustrating an electronic exchange for bill pay transactions, according to an embodiment of the present invention.

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As is traditional in the field of the present disclosure, example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the example embodiments may be physically separated into two or more interacting and discrete blocks, units and/or modules without departing from the scope of the inventive concepts. Further, the blocks, units and/or modules of the example embodiments may be physically combined into more complex blocks, units and/or modules without departing from the scope of the present disclosure.

An embodiment of the present invention provides a marketplace for secure collection, assignment and distribution of payments and data from bill check originators to lockbox providers. This eliminates paper checks, resulting in faster deposit into client accounts, better management of payment exceptions, and reduction in overall operating costs. For example, a consumer may receive a bill from a biller. The consumer may log onto a bill pay portal and submit a payment. An interbank information network (IIN) application may collect, align, and distribute bill pay payments and data to lockbox operations. Lockbox operations may receive digital payments, data and addendum and then distribute to a client. The client may then receive data and payments.

An embodiment of the present invention is directed to creating a digital exchange of data among industry providers for check transactions (initiated by bill pay or check origination service provider) and lockbox transactions via IIN or a check matching system. Details concerning the IIN are provided in U.S. application Ser. No. 16/279,137, filed Feb. 19, 2019, which is a continuation of U.S. application Ser. No. 16/015,709, filed Jun. 22, 2018, which claims priority to U.S. provisional application 62/523,429, filed Jun. 22, 2017, the contents of which are incorporated herein in their entirety. The application also relates to U.S. application Ser. No. 16/788,396, filed Feb. 12, 2020, which claims priority to U.S. provisional application 62/804,429, filed Feb. 12, 2019, the contents of which are incorporated herein in its entirety. An embodiment of the present invention is directed to creating an electronic exchange process so that lockbox clients' experience is not changed, with minimal to no intervention from these clients. According to an exemplary scenario, a financial institution may provide and maintain the electronic exchange. For example, a financial institution or other entity may commercialize participation in the exchange and fund it via maintenance fees as well as discounted transaction fees.

According to an embodiment of the present invention, the IIN provides a global platform using blockchain technology for real-time interconnected flow of information that addresses immediate pain points across the financial industry and enables new services. For example, the IIN as the distributed network may streamline the process for resolving compliance based inquiries and provide global beneficiary account validations. The IIN of an embodiment of the present invention may be directed to a platform/ecosystem that network participants may use to deliver value-added service applications to other network participants.

The IIN's live in production infrastructure and operating model support bill pay or check origination service providers and lockbox at participant banks and entities. Participants have the flexibility to use various applications. For example, IIN participants may choose how to use bill pay, check origination and lockbox features. IIN may support a variety of information share applications as a platform. For example, IIN may incorporate money movement on ledger as part of the bill pay, check origination and lockbox solution.

An embodiment of the present invention provides an ability to market to commercial providers who are not considered major players in the industry and also to corporate clients who process their own checks in-house. According to an embodiment of the present invention, blockchain and/or other distributed ledger technology and implementation of blockchain may be applied to improve security so that the system may be less reliant on current payment processing rails.

FIG. 1 is an exemplary flow illustrating an electronic exchange for conducting bill pay transactions or paper check transactions via IIN or a check matching system, according to an embodiment of the present invention. According to exemplary aspects, IIN may referred to as a check matching system. At step 110, a customer initiates a bill pay or a paper check transaction. At step 112, the transaction may be identified as one that is to be converted to a paper check. This may be done by the bill payer or a transaction originator. According to exemplary aspects, the conversion to a paper check may include an initial printing of a paper check and subsequent scanning of the printed check to generate a print image file or data for the respective transaction. In an example, the initial printing may be performed using regular (e.g., carbon black), non-specialized, ink or toner. At step 114, the bill payer or the transaction originator may acquire or pull down a lockbox directory, and the payment may be identified as being destined for a lockbox provider participating in an IIN as indicated by the lockbox directory. At step 116, the transaction may be written to a file with a set of data elements. According to exemplary aspects, the set of data elements may include a print image data or file. At step 118, the file may be sent to the IIN from the bill payer provider. At step 120, the IIN may then collect and collate the payments destined for each lockbox provider participant. This may include a bank, a third party and/or corporate lockbox participants. At step 122, the IIN may send daily (or other periodic) files to each lockbox provider. This may include options on how the financial transaction is processed. For example, options may include a one lump sum daily total payment accompanied by the data file that breaks down the distribution of funds, check images to be processed as image cash letters (ICLs), or converted to Automated Clearing House (ACH). ACH represents an electronic network for financial transactions. The ACH network facilitates electronic money transfers and automatic payments between banks and financial institutions. Other types of payment may be supported. At step 124, the data files and the payment files may be received and uploaded into each lockbox provider's systems. Once the data files and/or the payment files are uploaded to the lockbox providers' systems, the lockbox provider may facilitate electronic payment transaction, or alternatively, print and mail a substitute check according to instructions from an API of a respective lockbox provider. According to exemplary aspects, the lockbox provider may either facilitate electronic payment transaction or print and mail a substitute check according to one or more rules. Alternatively, the lockbox provider may print and mail the substitute check when electronic payment transaction fails after a predetermined number of attempts.

The order illustrated in FIG. 1 is merely exemplary. While the process of FIG. 1 illustrates certain steps performed in a particular order, it should be understood that the embodiments of the present invention may be practiced by adding one or more steps to the processes, omitting steps within the processes and/or altering the order in which one or more steps are performed.

Bill pay providers, or transaction/check originators, send paper checks to physical lockbox providers across the industry. This process generates operational cost for both sides of the payment transactions (e.g., postage fees, sorting and processing of paper checks, etc.). Internally, a financial institution may send paper checks to a lockbox for specific reasons, including inability to process e-payment for e-lockbox clients due to incorrect payment information. In addition, paper checks may be needed for lockbox clients that are not subscribed to an electronic service, such as e-lockbox or Automated Clearing House (ACH) Direct Send.

An embodiment of the present invention is directed to providing a centralized network to enable banking participants (e.g., bill payers and lockbox providers) to compress, net and process payments. Banking participants may also generate related data files and provide exception management capabilities. With the various features of an embodiment of the present invention, the system may eliminate (or substantially reduce) physical check exchange between bill pay or check origination providers and lockbox providers leading to increased cycle time for processing electronic payments. Additional benefits may include reduction in paper, resource savings, client benefits (e.g., faster deposits to clients' accounts and lower fees), standard industry operating model (e.g., streamline payables and receivables processes with industry participants) and improved exception management (e.g., improved handling of exceptions via auto-matching reduces impact of errors across the industry).

Figure 2:
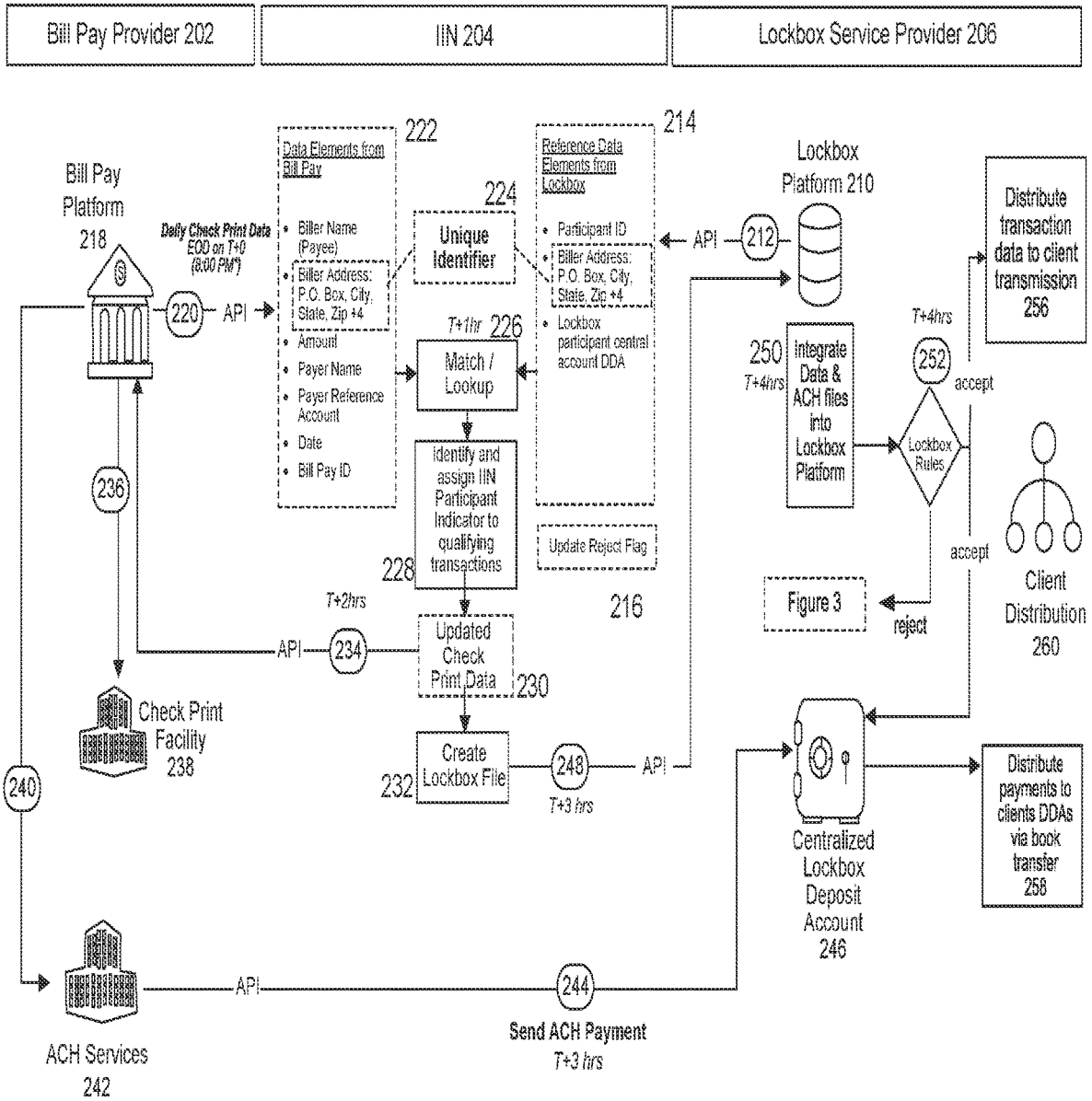
FIG. 2 is an exemplary flow illustrating an electronic exchange for bill pay transactions via IIN, according to an embodiment of the present invention.

FIG. 2 is an exemplary flow illustrating an electronic exchange for bill pay transactions via IIN, according to an embodiment of the present invention. FIG. 2 illustrates a digital bill pay lockbox platform via IIN. FIG. 2 demonstrates interactions between bill pay provider 202, IIN 204 and lockbox service provider 206. According to exemplary aspects, bill pay provider may include a paper check transaction originator, and IIN may include a check matching system.

According to an embodiment of the present invention, a bill pay provider may initiate an electronic payment. Bill pay clients may include individuals and small businesses as well as other entities. Bill pay providers may include banks, financial institutions, corporate bill pay providers. Electronic payment details may include routing number, account number, biller name, an amount, date, payor account number, payer name, bill address and/or other payment data. A single data file per bill pay provider with sender details may be received by IIN. IIN may include a computer system or processor that executes an IIN application or other program.

The IIN may process the inputs. This may involve consolidating payments from bill pay providers and collating payments for lockbox providers and/or corporates. The IIN may further create a data file with determined transactions for lockbox providers and/or corporates. The IIN may create a payment file per lockbox provider and/or corporate preference. In addition, the IIN may create an image file of check templates for lockbox providers and/or corporates. The IIN may output image files, data files, payment files and/or other files to lockbox providers. Lockbox providers may then disburse data, image and/or payments to clients and/or billers. In addition, lockbox providers may load data to a corresponding accounts receivable system. Lockbox clients may manage accounts receivable, image archive and demand deposit account (DDA) information.

As shown in FIG. 2, lockbox platform 210 may transmit biller data. For example, lockbox platform 210 may provide biller lockbox address and reference data via real time updates. Lockbox platform may provide this information at 212 via API. Reference data elements may be represented at 214, which may include participant identifier, biller address, lockbox participant central account DDA, etc. Reference data may also include an update reject flag shown by 216. Other flags may be applied to identify other conditions, status, etc. Although not explicitly illustrated, once the biller data has been provided to the IIN 204 or a check matching system, the IIN 204 consolidates the biller data into a lockbox directory stored at the IIN 204.

Bill pay platform 218 may pull the lockbox directory stored at the IIN 204 and transmit check print files to a lockbox provider included in the lockbox directory. For example, bill pay platform 218 may provide daily (or other interval) check print data at 220 via an API. According to exemplary aspects, the check print data may include text data and image data/file, which may be generated by the bill pay platform 218 or the paper check originator. Data elements 222 may include biller name (e.g., payee), biller address, amount, payer name, payer reference account, date, bill pay identifier, an image file, remittance information, etc.

IIN 204 may support nodes or other interfaces to receive data. This may include bill pay provider nodes, lockbox provider nodes, etc. IIN 204 may generate a unique identifier 224, which may be based on biller address information, for example. IIN 204 may match datasets from bill pay provider 202 and lockbox service provider 206 to identify IIN participants. At 226, IIN 204 may perform a match or lookup that compares data elements 222 and reference data 214. IIN

204 may then identify and assign an IIN participant indicator to qualifying transactions at 228. At 230, check print data may be updated. At 232, a lockbox file may be created. IIN may send an updated file with flags that identify which transactions require check print and which transaction go through IIN at 234. IIN may distribute data to bill pay provider 202 and lockbox service provider 206. For example, data may be published on a distributed ledger where access to data may be restricted and/or protected.

At 236, bill pay platform 218 may send non-IIN transactions to check print facility 238. At 240, bill pay platform 218 may send IIN participants to ACH services 242. At 244, ACH payment may be sent from ACH Services 242 to centralized lockbox deposit account 246. For example, ACH Services 242 may create nightly (or other interval) ACH files to each lockbox provider corresponding to the IIN flagged transactions. Simultaneously (or near simultaneously) with 244, IIN participant lockbox data file may be sent to lockbox platform 210 via 248.

At 250, data and ACH files may be integrated into lockbox platform 210. At 252, lockbox rules may be applied to determine whether transactions are accepted or rejected. Other rules and/or conditions may be applied. If accepted, transaction data may be distributed to client transmission, at 256. Payments may be distributed to clients DDAs (or other accounts) via book transfer, at 258. Client distributions may be made at 260. If rejected, the flow may proceed to FIG. 3. However, aspects of the present disclosure are not limited thereto, such that if a transaction is rejected, then the transaction may be sent to a check print vendor or system for printing and mailing of a check to an intended recipient.

An embodiment of the present invention is directed to ACH files as one illustrative example. Other forms of payment may be applied. For example, an embodiment of the present invention may be applied to digital currency and other forms of payment.

Figure 3:
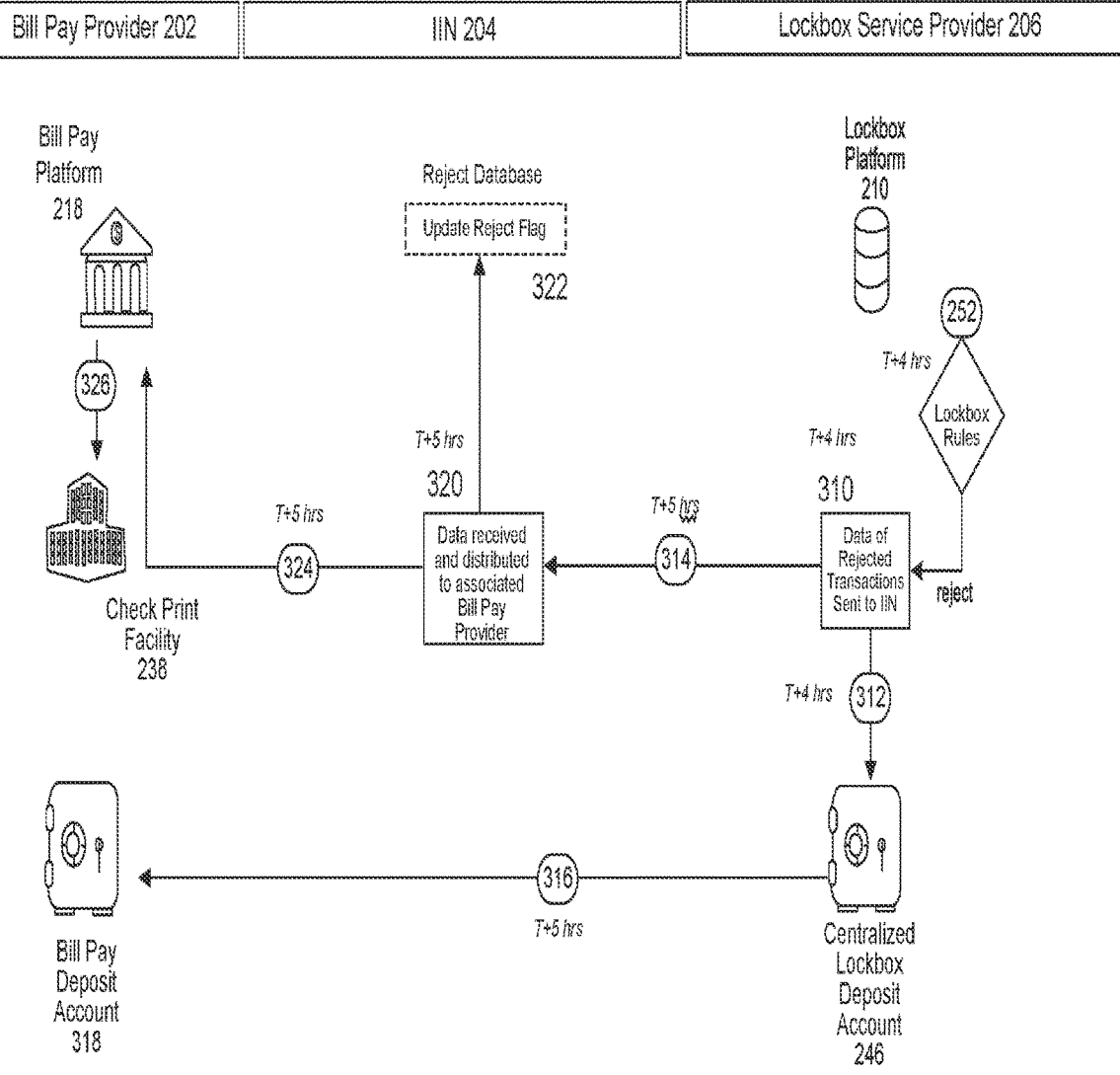
FIG. 3 is an exemplary flow illustrating an electronic exchange for bill pay transactions via IIN, according to an embodiment of the present invention.

FIG. 3 is an exemplary flow illustrating an electronic exchange for bill pay transactions via IIN, according to an embodiment of the present invention. According to exemplary aspects, IIN may referred to as a check matching system. FIG. 3 demonstrates interactions between bill pay provider 202, IIN 204 and lockbox service provider 206. FIG. 3 provides details when lockbox rules may determine a rejected transaction at 252. At 310, data of rejected transactions may be sent to IIN 204. At 312, instructions may be sent to centralized lockbox deposit account 246 to revert funds back to a bill pay deposit account. At 314, rejected data may be sent from lockbox service provider 206 to IIN 204, centralized lockbox deposit account 246 may return funds with associated reference data via 316 to bill pay deposit account 318. At 320, data may be received by IIN and distributed to an associated bill pay provider. At 322, a reject database may log a specific remitter of the transaction to the specific lockbox and then reject future transactions of the remitter to the specific lockbox going forward. As shown by 322, a reject flag may be updated. Other flags may be applied to identify other conditions, status, etc. At 324, reject data may be sent to bill pay providers 202 via bill pay platform 218. At 326, rejected transactions received may be recycled back into business as usual (BAU) check print files and follow BAU legacy model at check print facility 238.

Figure 4:
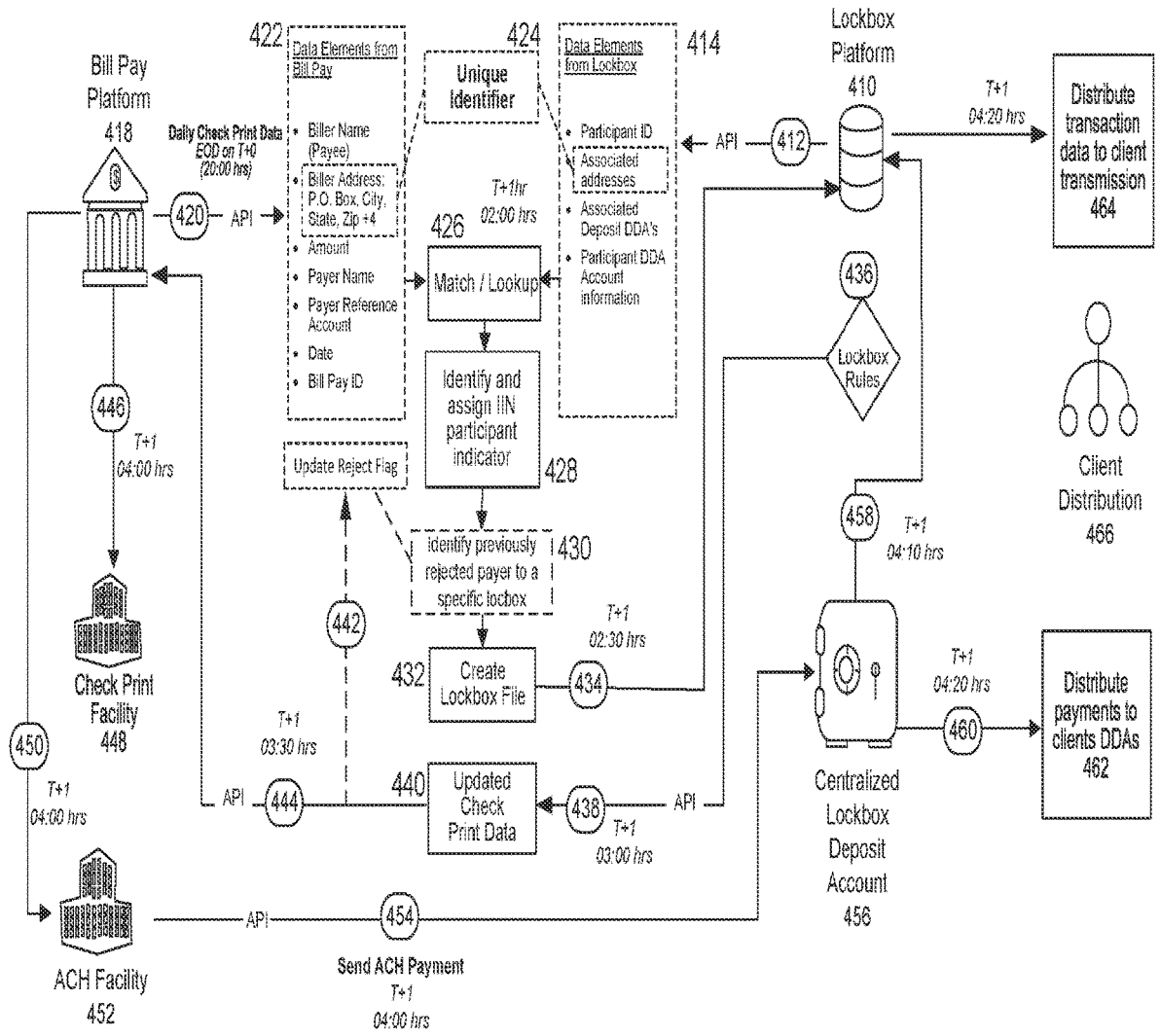
FIG. 4 is an exemplary flow illustrating an electronic exchange for bill pay transactions via IIN, according to an embodiment of the present invention.

FIG. 4 is an exemplary flow illustrating an electronic exchange for bill pay transactions via IIN, according to an embodiment of the present invention. According to exemplary aspects, IIN may referred to as a check matching system. FIG. 4 may represent a variation of the exemplary flow illustrated in FIG. 2. FIG. 4 illustrates a digital bill pay lockbox platform via IIN. FIG. 4 demonstrates interactions between bill pay provider 402, IIN 404 and lockbox service provider 406. Lockbox platform 410 may provide biller lockbox address and reference data via real time updates. Lockbox platform may provide this information at 412 via API. Reference data elements may be represented at 414, which may include participant identifier, associated addresses, associated deposit DDA's, participant DDA account information, etc.

Bill pay platform 418 may provide daily check print data at 420 via an API. Data elements 422 may include biller name (e.g., payee), biller address, amount, payer name, payer reference account, date, bill pay identifier, etc.

IIN 404 may generate a unique identifier 424, which may be based on a data element, such as an associated address information, for example. At 426, IIN 204 may perform a match or lookup that compares data elements from bill pay 422 and data elements from lockbox 414. IIN 404 may then identify and assign an IIN participant indicator at 428. At 430, a previously rejected payer to a specific lockbox may be identified. At 432, a lockbox file may be created. At 434, IIN participant lockbox data file may be sent to lockbox platform 410. At 436, lockbox rules may be applied. For example, the rules may identify rejected transactions and also provide reject reasons, such as "Stop/Go" file, unacceptable payee, client driven exceptions, etc. At 438, IIN participant may send accepted and/or rejected transactions. At 440, check print data may be updated. At 442, a reject flag may be updated. Other flags may be applied to identify other conditions, status, etc. At 444, an updated file may be sent to bill pay platform 418. The updated file may include accepted IIN participant transactions with associated lockbox provide indicator; rejected IIN participant transactions; previously rejected payers for a lockbox and non IIN participant transactions. Other types of transactions may be included. At 446, bill pay platform 418 may send updated file data, e.g., rejected IIN participant transactions; previously rejected payers for a lockbox and non IIN participant transactions, to check print facility 448. At 450, bill pay platform 418 may send updated file data, e.g., accepted IIN participant transactions with associated lockbox provide indicator, to ACH facility 452. For example, ACH facility 452 may create nightly (or other interval) ACH files to each lockbox provider. At 454, ACH payment may be sent from ACH facility 452 to centralized lockbox deposit account 456. At 458, centralized lockbox deposit account 456 may notify of an ACH receipt to lockbox platform 410. As shown in FIG. 4, ACH is one illustrative example. Other forms of payment, including digital currency, may be applied. At 460, payments may be distributed to clients DDAs (or other accounts) as shown by 462. Transaction data may be distributed via client transmission as shown by 464. Client distributions may be made at 466.

Figure 5:
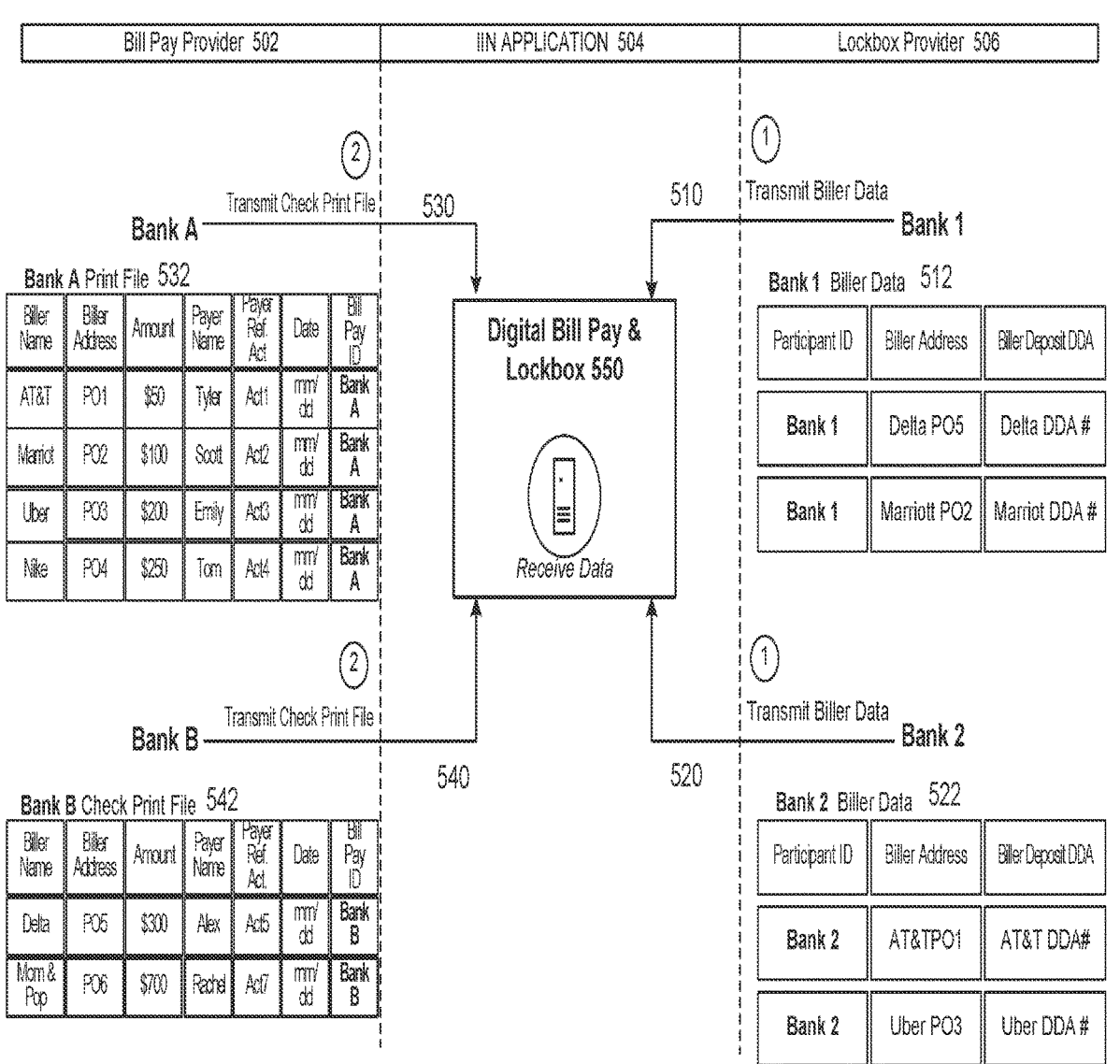
FIG. 5 is an exemplary system diagram, according to an embodiment of the present invention.

FIG. 5 is an exemplary system diagram, according to an embodiment of the present invention. FIG. 5 illustrates interactions between bill pay provider 502, IIN application 504 and lockbox provider 506. As shown in FIG. 5, digital bill pay & lockbox 550 may include nodes, e.g., bill pay provider nodes and lockbox provider nodes. Bill pay and lockbox providers send data to digital lockbox application, such as IIN application that executes on a platform or central system. According to exemplary aspects, IIN may referred to as a check matching system.

Lockbox provider 506 may include bank 1 and bank 2. Bank 1 may transmit biller data to digital bill pay & lockbox 550 via 510. Digital bill pay & lockbox 550 may include a user interface to receive data. Bank 1 biller data 512 may include participant identifier (ID), biller address, biller deposit DDA, etc. Address information may be represented by PO Box numbers, for example. Bank 2 may transmit biller data to digital bill pay & lockbox 550 via 520. Bank 2 biller data 522 may include participant ID, biller address, biller deposit DDA, etc.

Bill pay provider 502 may include bank A and bank B. Bank A may transmit a check print file to digital bill pay & lockbox 550 via 530. Bank A print file 532 may include biller name, biller address, amount, payer name, payer reference account, date and bill pay ID, etc. Bank B may transmit check print file to digital bill pay & lockbox 550 via 540. Bank B check print file 542 may include biller name, biller address, amount, payer name, payer reference account, date and bill pay ID, etc.

Figure 6:
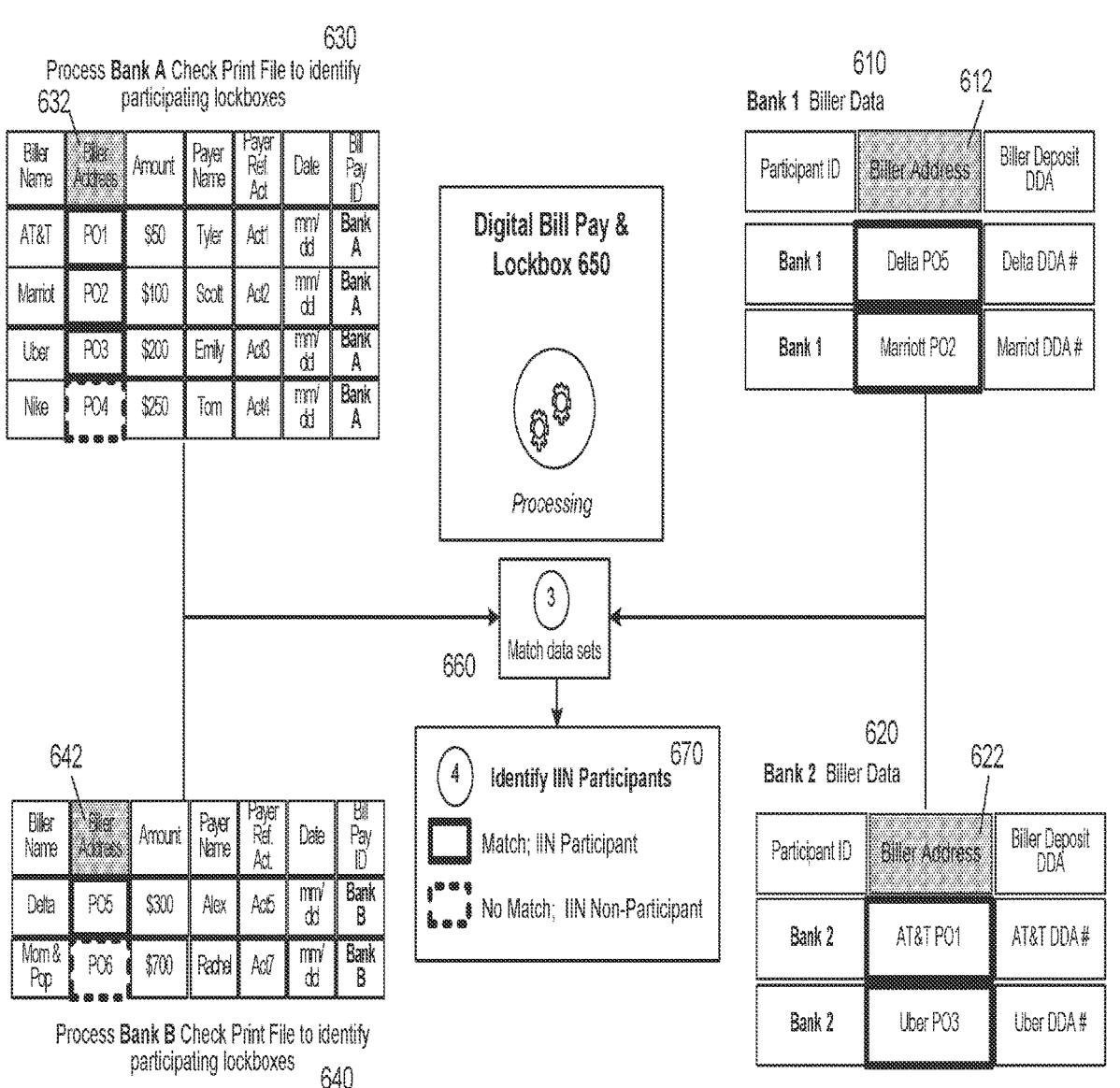
FIG. 6 is an exemplary system diagram, according to an embodiment of the present invention.

FIG. 6 is an exemplary system diagram, according to an embodiment of the present invention. An embodiment of the present invention may match bill pay and lockbox provider data sets to identify IIN participants. As shown in FIG. 6, data sets may be matched at 660. Bank 1 biller data 610 and Bank 2 biller data 620 may be compared with data from Bank A and Bank B. According to exemplary aspects, IIN may referred to as a check matching system.

Bank A check print file may be processed to identify participating lockboxes at 630. Bank B check print file may be processed to identify participating lockboxes at 640. At 660, a unique identifier may be used for matching as shown by 612 and 622 (from biller data) and 632 and 642 (from check print files). Data sets may be matched to identify IIN participants at 670. Matched identifiers may be processed by comparing biller addresses, as shown by 632 and 642. In this example, matched participants may be identified as PO1, PO2, PO3 (at bank A check print file) and PO5 (at bank B check print file). Mismatched participants may be identified as PO4 (at bank A check print file) and PO6 (at bank B check print file).

Figure 7:
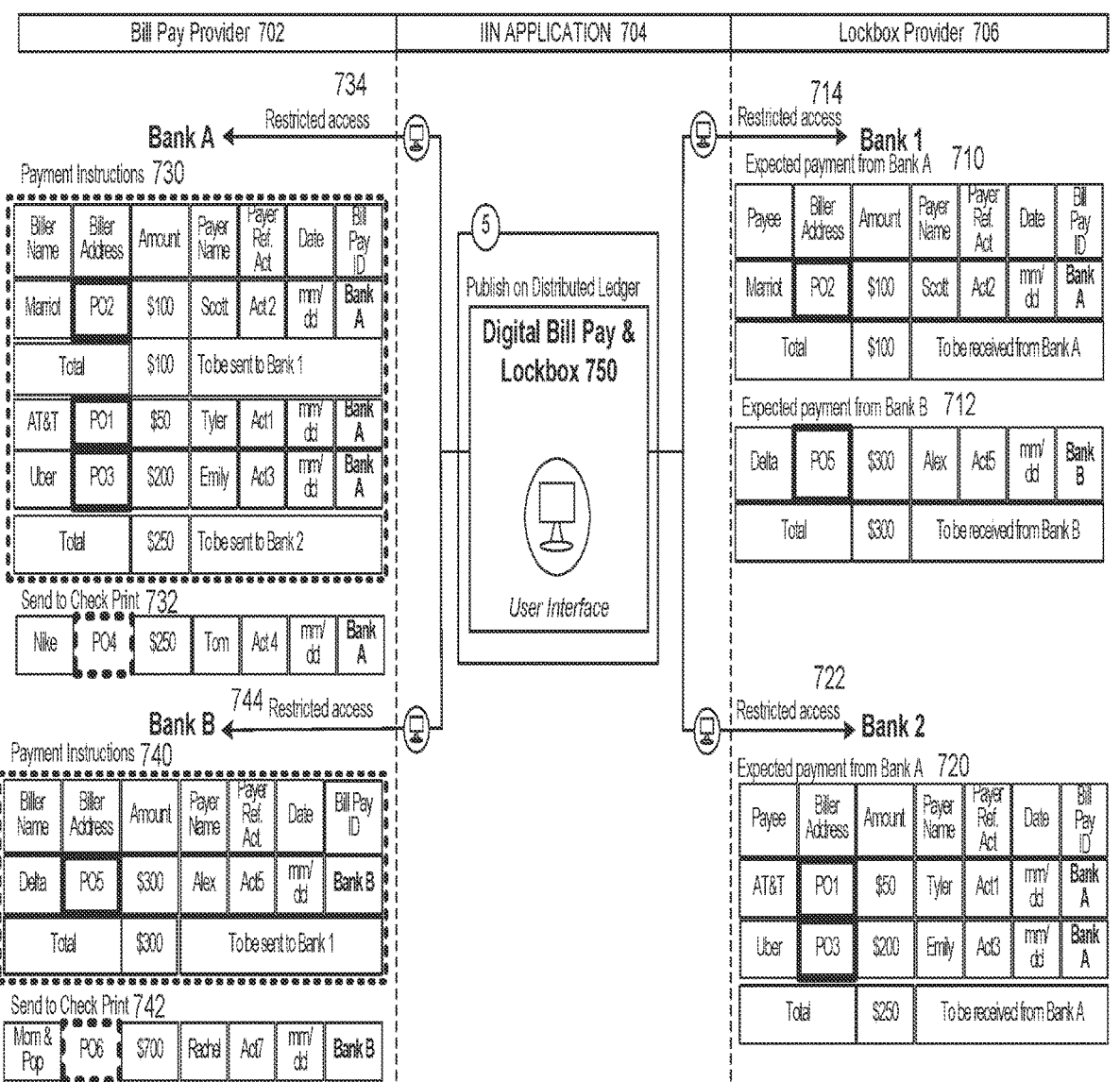
FIG. 7 is an exemplary system diagram, according to an embodiment of the present invention.

FIG. 7 is an exemplary system diagram, according to an embodiment of the present invention. IIN application distributes data to bill pay and lockbox providers. FIG. 7 illustrates interactions between bill pay provider 702, IIN application 704 and lockbox provider 706. Digital bill pay & lockbox 760 may publish data on a distributed ledger. For example, a single distributed ledger with built-in entitlements may be provided for restricted access.

Bank 1 may receive an expected payment from bank A, as shown by 710. The payment file may include payee, biller address, amount, payer name, payer reference account, bill pay ID, etc. Bank 1 may also receive an expected payment from bank B, as shown by 712. Restricted access may be provided at 714.

Bank 2 may receive an expected payment from bank A, as shown by 720. The payment file may include payee, biller address, amount, payer name, payer reference account, bill pay ID, etc. Restricted access may be provided at 722.

Bank A may access payment instructions 730, which may include biller name, biller address, amount, payer name, payer reference account, date, bill pay ID, etc. Payment instructions may be sent to multiple recipients, including bank 1 and bank 2. Bank A may also send to check print 732. Restricted access may be provided at 734.

Bank B may access payment instructions 740, which may include biller name, biller address, amount, payer name, payer reference account, date, bill pay ID, etc. Payment Instructions may be sent to one or more recipients, including Bank 1. Bank B may also send to check print 742. Restricted Access may be provided at 744.

Figure 8:
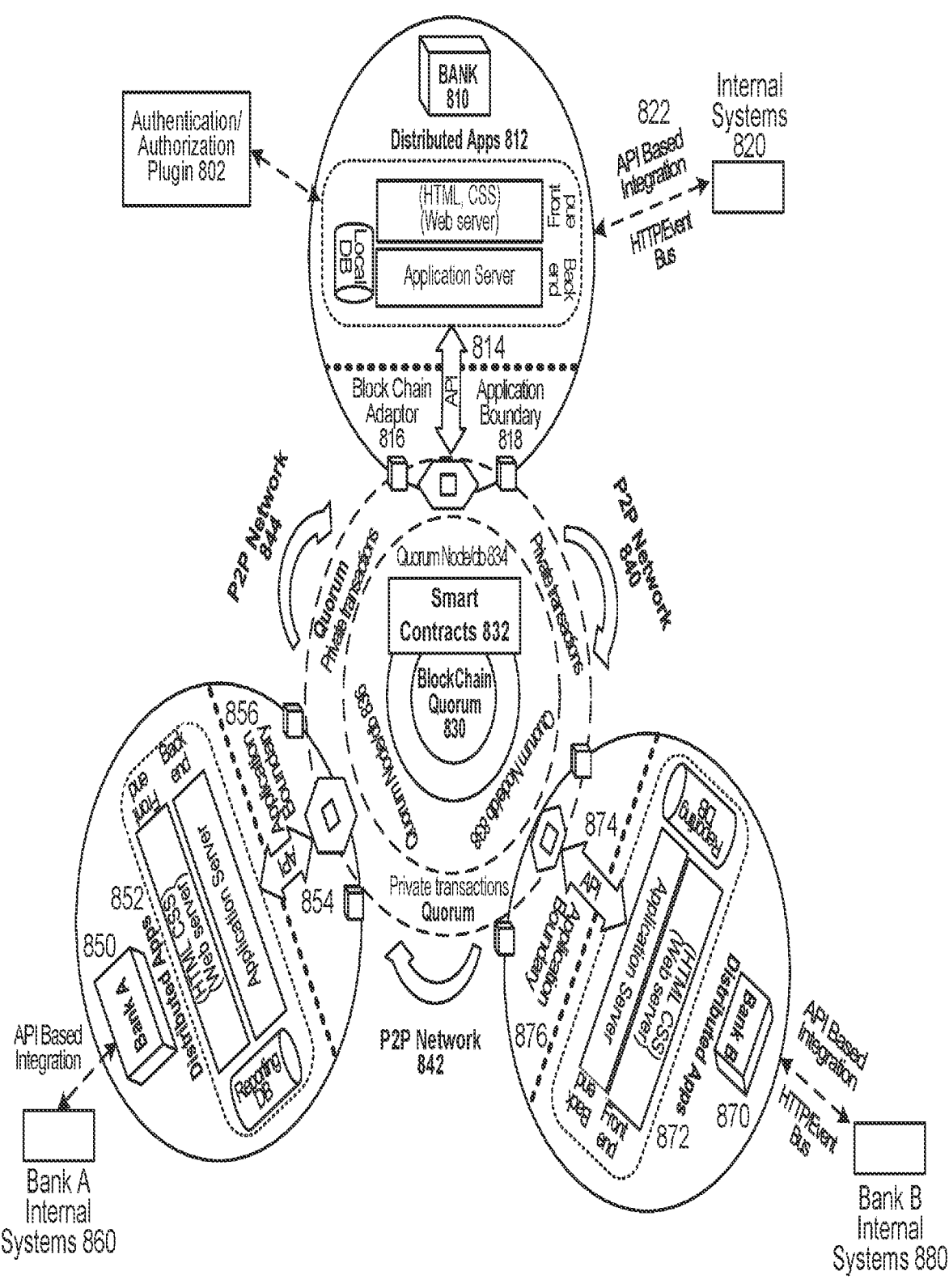
FIG. 8 is an exemplary system diagram, according to an embodiment of the present invention.

FIG. 8 is an exemplary system diagram, according to an embodiment of the present invention. IIN may be deployed as a Distributed Application with a layered approach for UI, service, orchestration, and integration layers. According to exemplary aspects, IIN may referred to as a check matching system.

As shown in FIG. 8, Bank 810 may support distributed applications 812, which may include front end (e.g., web server), back end (e.g., application server) and a local database. For example, application server may provide a service based approach for message parsing, logging, business logic and other services. Distributed apps 812 may communicate with authentication/authorization plugin 802. Distributed apps 812 may also communicate with internal systems 820, via communication network 822 which may provide API based integration and support HTTP/event bus. An embodiment of the present invention may provide an adaptor-based approach for Integration with underlying blockchain. Distributed apps 812 may communicate with a quorum node/dB 834 via API 814. Bank 810 may further implement block chain adaptor 816 and application boundary 818.

As shown in FIG. 8, each participant node may integrate with an underlying blockchain. An embodiment of the present invention may provide various key features including configuration based permissioning; privacy via private contracts and transactions; RAFT based consensus for high performance (other consensus algorithms may be applied); and smart contracts.

Blockchain quorum 830 may be smart contracts based, as shown by 832. Quorum nodes/dB may communicate with each bank or other participant. For example, Quorum node/dB 834 may communicate with bank 810; quorum node/dB 836 may communicate with bank A 850; and quorum node/dB 838 may communicate with bank B 870. Private transactions may be supported by P2P networks, represented by 840, 842 and 844.

Bank A 850 may support distributed applications 852, which may include front end (e.g., web server), back end (e.g., application server) and a reporting database. For example, application server may provide a service based approach for message parsing, logging, business logic and other services. Bank A 850 may also communicate with Bank A internal systems 860, via an API based integration. Distributed apps 852 may communicate with a quorum Node/dB 836 via API 854. Bank A 850 may further implement application boundary 856.

Bank B 870 may support distributed applications 872, which may include front end (e.g., web server), back end (e.g., application server) and a reporting database. For example, application server may provide a service based approach for message parsing, logging, business logic and other services. Bank B 870 may also communicate with Bank B internal systems 880, via an API based integration and/or HTTP/event bus. Distributed apps 872 may communicate with a quorum node/dB 838 via API 874. Bank B 870 may further implement application boundary 876.

Figure 9:
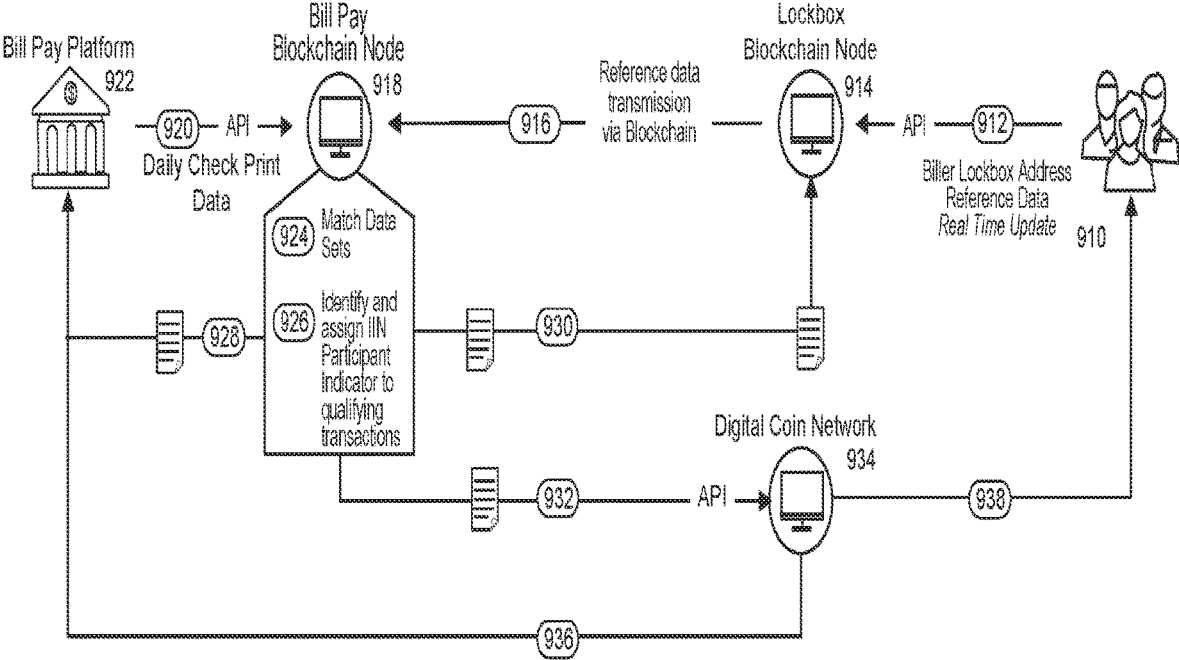
FIG. 9 is an exemplary flow illustrating an electronic exchange for bill pay transactions via IIN, according to an embodiment of the present invention.

FIG. 9 is an exemplary flow illustrating an electronic exchange for bill pay transactions via IIN, according to an embodiment of the present invention. According to exemplary aspects, IIN may referred to as a check matching system.

At 912, lockbox data may be sent from lockbox providers 910 to lockbox blockchain node 914. Billers may include clients that have few rules and possibility of exceptions. Lockbox data may include addresses and reference data, which may be sent via real-time updates. At 916, reference data transmission may be sent via blockchain to bill pay blockchain node 918.

Application functionality may be deployed on bill pay blockchain nodes and lockbox blockchain nodes. Bill pay blockchain nodes may include API to check print systems; UI to monitor status of transactions and other functionality. In addition, bill pay blockchain nodes may interact with other lockbox nodes only (e.g., no interaction with other bill pay nodes); receive and store lockbox reference data from lockbox nodes; match bill pay and lockbox reference data to identify eligible transactions; parse and transmit bill pay transactions to appropriate lockbox nodes; and receive enriched check print transactions from lockbox nodes indicating transactions that are rejected by lockbox and initiate settlements.

Lockbox blockchain nodes may include API to remittance systems and rules engines; UI to monitor status of transactions and other functionality. In addition, lockbox blockchain nodes may interact with other bill pay nodes only; send lockbox reference data periodically or real-time; store own lockbox reference data; ingest bill pay transactions from other bill pay nodes; transmit bill pay transactions to lockbox rules engine; ingest feedback from rules engine indicating rejected transactions; and transmit enriched check print transmission to appropriate bill pay nodes indicating transactions that are rejected.

At 920, bill pay platform 922 may send check print data, which may occur daily or at other intervals, to bill pay blockchain node 918. For example, an additional channel may be implemented for check print transmission. As shown in FIG. 9, check print data may be sent to IIN app residing on a node via an API automated channel. Node 918 may execute an IIN application.

At 924, IIN app may match the two data sets to determine eligible transactions. At 926, IIN app may flag the IIN eligible transactions, as well as the transactions eligible for settlement via digital coin network 934. At 928, IIN app may create an updated file. At 930, IIN app may parse eligible transactions and transmit the same to lockbox blockchain node 914.

At 932, IIN app may send instructions for issuance, transfer and redemption requests via a digital coin API. Digital coin network 934 may send the updated notification once the funds have settled to bill pay platform 922, via 936, and lockbox providers 910, via 938.

Figure 10:
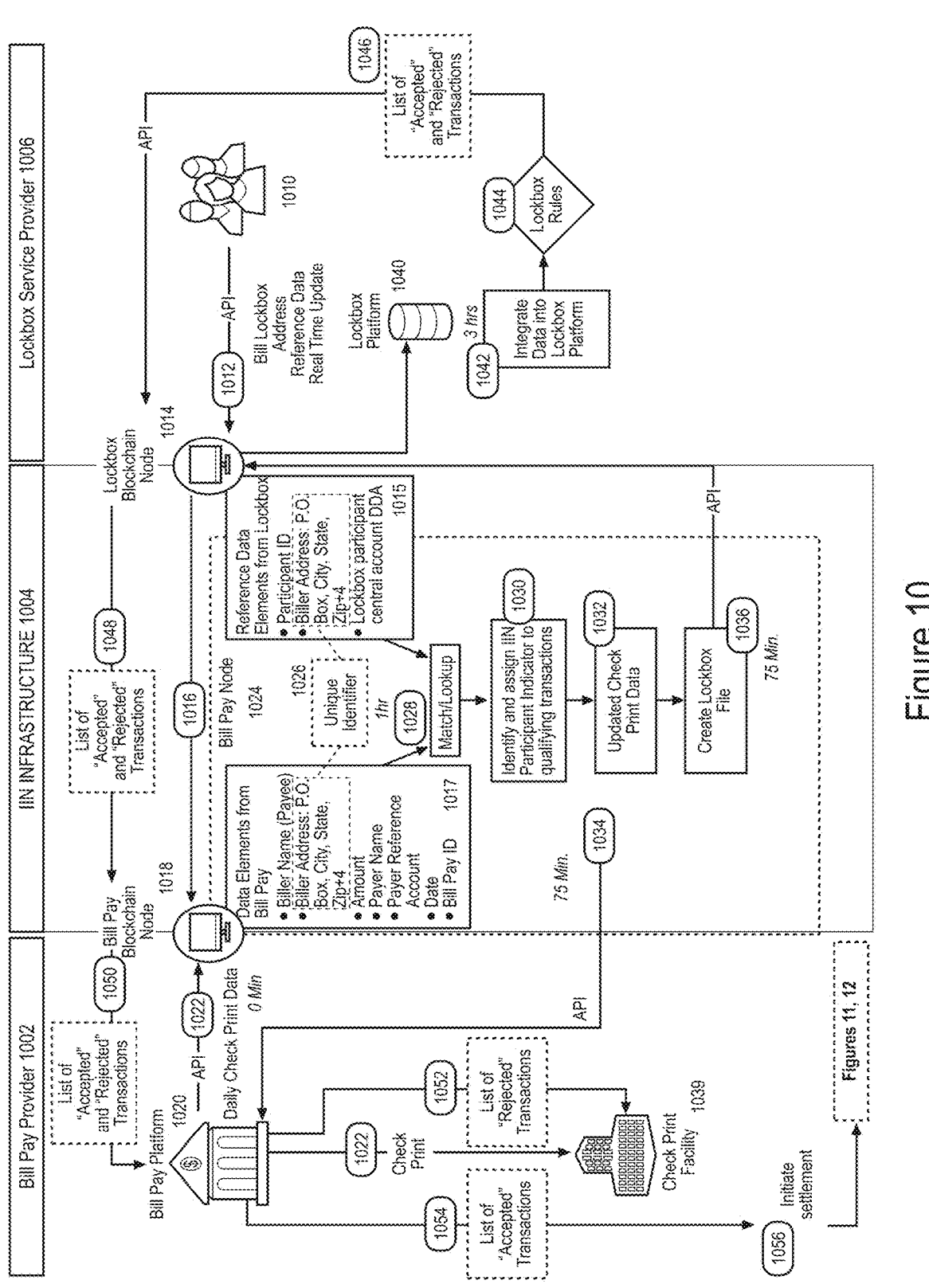
FIG. 10 is an exemplary flow illustrating an electronic exchange for bill pay transactions via IIN, according to an embodiment of the present invention.

FIG. 10 is an exemplary flow illustrating an electronic exchange for bill pay transactions via IIN, according to an embodiment of the present invention. According to exemplary aspects, IIN may referred to as a check matching system. FIG. 10 demonstrates interactions between bill pay provider 1002, IIN infrastructure 1004 and lockbox service provider 1006. Lockbox providers 1010 may provide biller lockbox address and reference data via real time updates, via 1012. This information may be provided to a lockbox blockchain node 1014 via API. Reference data elements may be represented at 1015, which may include participant identifier, associated addresses (e.g., biller address), lockbox participant central account, DDA, etc. At 1016, reference data may be transmitted via IIN network to bill pay blockchain node 1018.

Bill pay platform 1020 may provide daily check print data at 1022 via API. Data elements 1017 may include biller name (e.g., payee), biller address, amount, payer name, payer reference account, date, bill pay identifier, etc.

Bill pay node 1024 may generate a unique identifier 1026, which may be based on a data element, such as an associated address information, for example. At 1028, bill pay node 1024 may perform a match or lookup that compares data elements. Bill pay node 1024 may then identify and assign an IIN participant indicator to qualifying transactions at 1030. At 1032, check print data may be updated.

At 1034, data transmission to bill pay platform 1020 may include data with flags that identify which transactions require check print and which transactions go through IIN with an indicator that associates a lockbox provider. At 1036, a lockbox file may be created. IIN app on lockbox node may consolidate bill pay transaction data at lockbox blockchain node 1014.

At 1038, bill pay platform 1020 may send non-IIN transactions to check print, via business as usual legacy systems.

At 1042, lockbox blockchain node 1014 may integrate data into lockbox platform 1040. Lockbox rules may be applied at 1044 to determine accepted and rejected transactions. A list or other communication may be sent via 1046 to lockbox blockchain node 1014, via API. At 1048, lockbox blockchain node 1014 may send a list of accepted and rejected transactions to bill pay blockchain node 1018. At 1050, the list may be communicated to bill pay platform 1020. At 1052, a list of rejected transactions may be sent to check print facility 1039. At 1054, a list of accepted transactions may be sent to a settlement process at 1056. The settlement process is illustrated in further detail by FIGS. 11 and 12.

Figure 11:
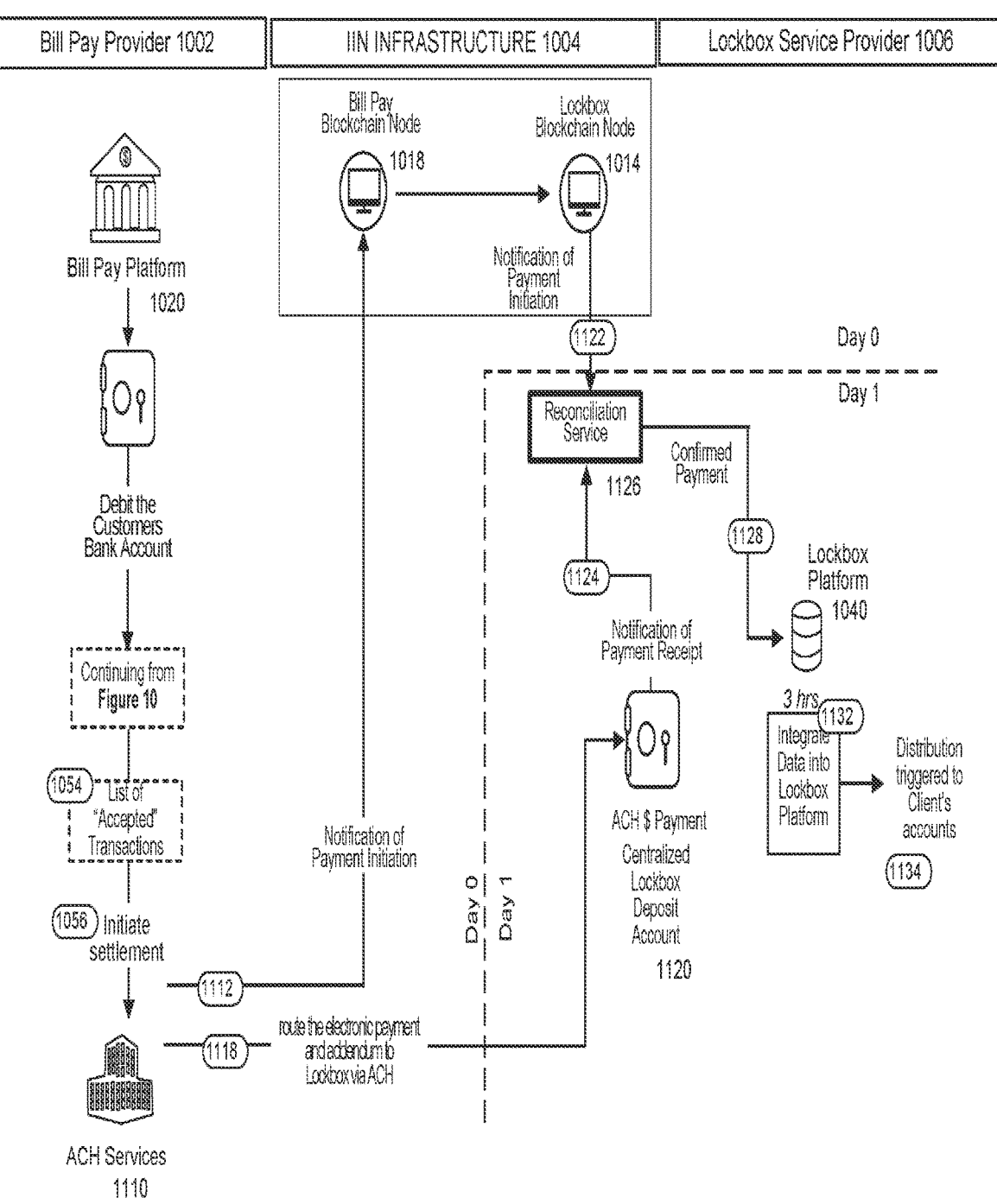
FIG. 11 is an exemplary flow illustrating a settlement flow, according to an embodiment of the present invention.

FIG. 11 is an exemplary flow illustrating a settlement flow, according to an embodiment of the present invention. The settlement flow of FIG. 11 illustrates a settlement flow for ACH services. As shown in FIG. 11, bill pay platform 1020 may debit customers' bank accounts. For banks, this may happen at the same (or near same) time as the initiation of the bill pay transaction. At 1054, a list of accepted transactions may be sent to a settlement process at 1056.

At 1112, ACH services 1110 may send a notification of payment initiation to bill pay blockchain node 1018, which communicates to lockbox blockchain node 1014.

At 1118, ACH services 1110 may route an electronic payment (e.g., CTX file) and addendum to lockbox via ACH 1120. ACH 1120 may represent a centralized lockbox deposit account. At 1122, notification of payment initiation may be sent to reconciliation service 1126. At 1124, ACH 1120 may send a notification of payment receipt to reconciliation service 1126. At 1128, payment confirmation may be sent to lockbox platform 1040. At 1132, data may be integrated into lockbox platform 1040. Distribution may be triggered to client accounts at 1134.

Figure 12:
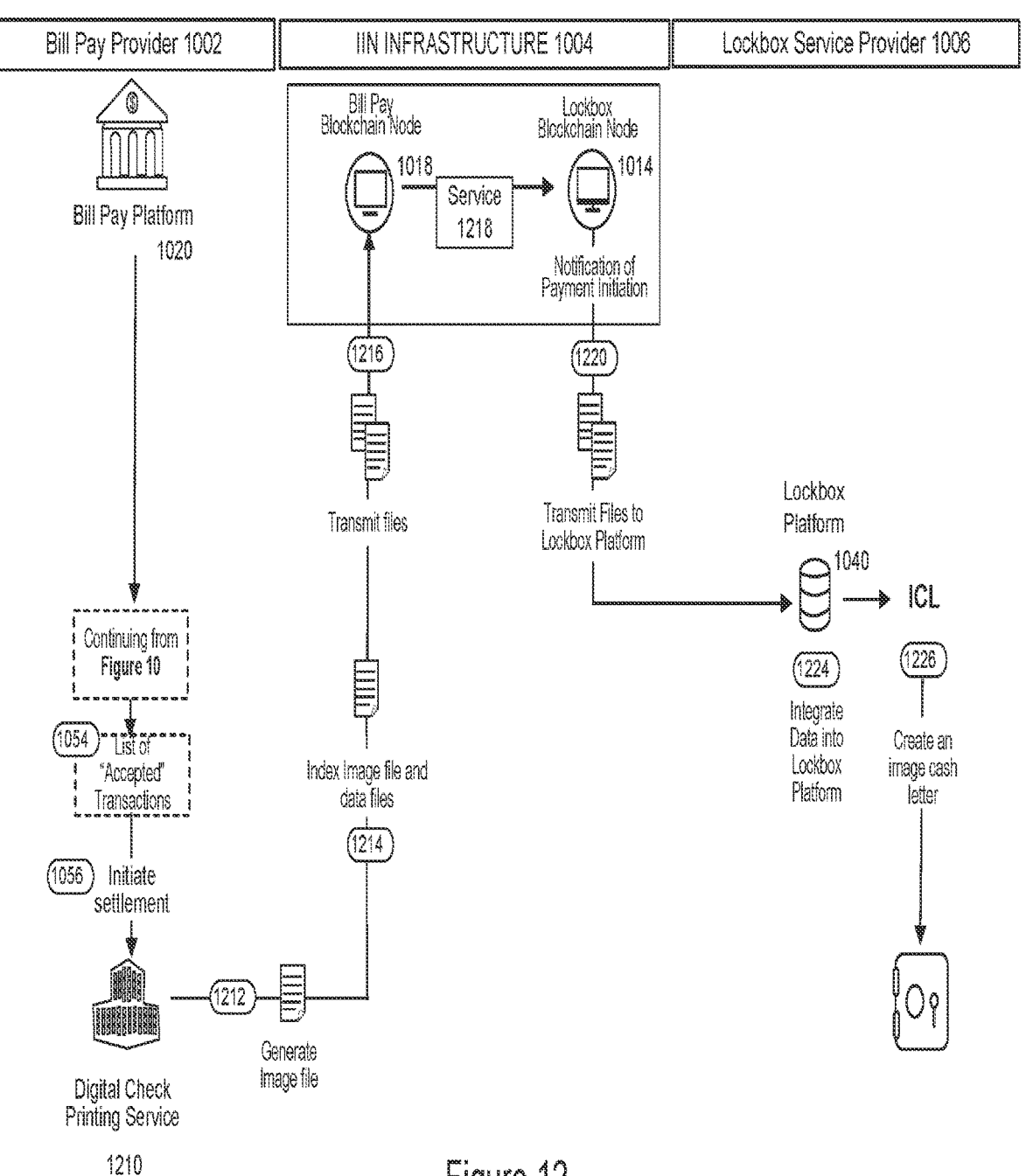
FIG. 12 is an exemplary flow illustrating a settlement flow, according to an embodiment of the present invention.

FIG. 12 is an exemplary flow illustrating a settlement flow, according to an embodiment of the present invention. The settlement flow of FIG. 12 illustrates a settlement flow for digital checks. As shown in FIG. 12, bill pay platform 1020 may debit customer's bank accounts. For banks, this may happen at the same (or near same) time as the initiation of the bill pay transaction. In addition, debiting a customer's account may or may not happen depending on a bank's model or if it's coming from a third party check originator. At 1054, a list of accepted transactions may be sent to a settlement process at 1056.

As shown in FIG. 12, digital check printing Services 1210 may centrally print images (e.g., 6 or more) on a page than scan these images into an image file, at 1212. Other formats may be implemented. At 1214, image file and data files may be indexed to align each transaction to an image. At 1216, both files may be transmitted to bill pay blockchain node 1018 and lockbox blockchain node 1014. Service 1218 may print check images received from a check originator and then scan those pages into a check image file. IIN may then distribute the data and image files to an identified lockbox provider for which that transaction belongs. According to exemplary aspects, IIN may referred to as a check matching system. Lockbox blockchain node 1014 may send a notification of payment initiation to lockbox platform 1040. Lockbox blockchain node 1014 may distribute assigned transactions and accompanying data and image. At 1220, both files may be transmitted to lockbox platform 1040.

At 1224, data may be integrated into lockbox platform 1040. Image cash letter (ICL) may create an image cash letter using check image files to send for clearing, at 1226.

FIGS. 2-4 and 10-12 illustrate exemplary flows, according to the various embodiments of the present invention. The flows include a representative timing in the form of T+X time, which is illustrative and exemplary and do not intend to limit the invention to a specific timing. The order of flows illustrated in FIGS. 2-4 and 10-12 is merely exemplary. While the processes of FIGS. 2-4 and 10-12 illustrate certain steps performed in a particular order, it should be understood that the embodiments of the present invention may be practiced by adding one or more steps to the processes, omitting steps within the processes and/or altering the order in which one or more steps are performed.

Figure 13:
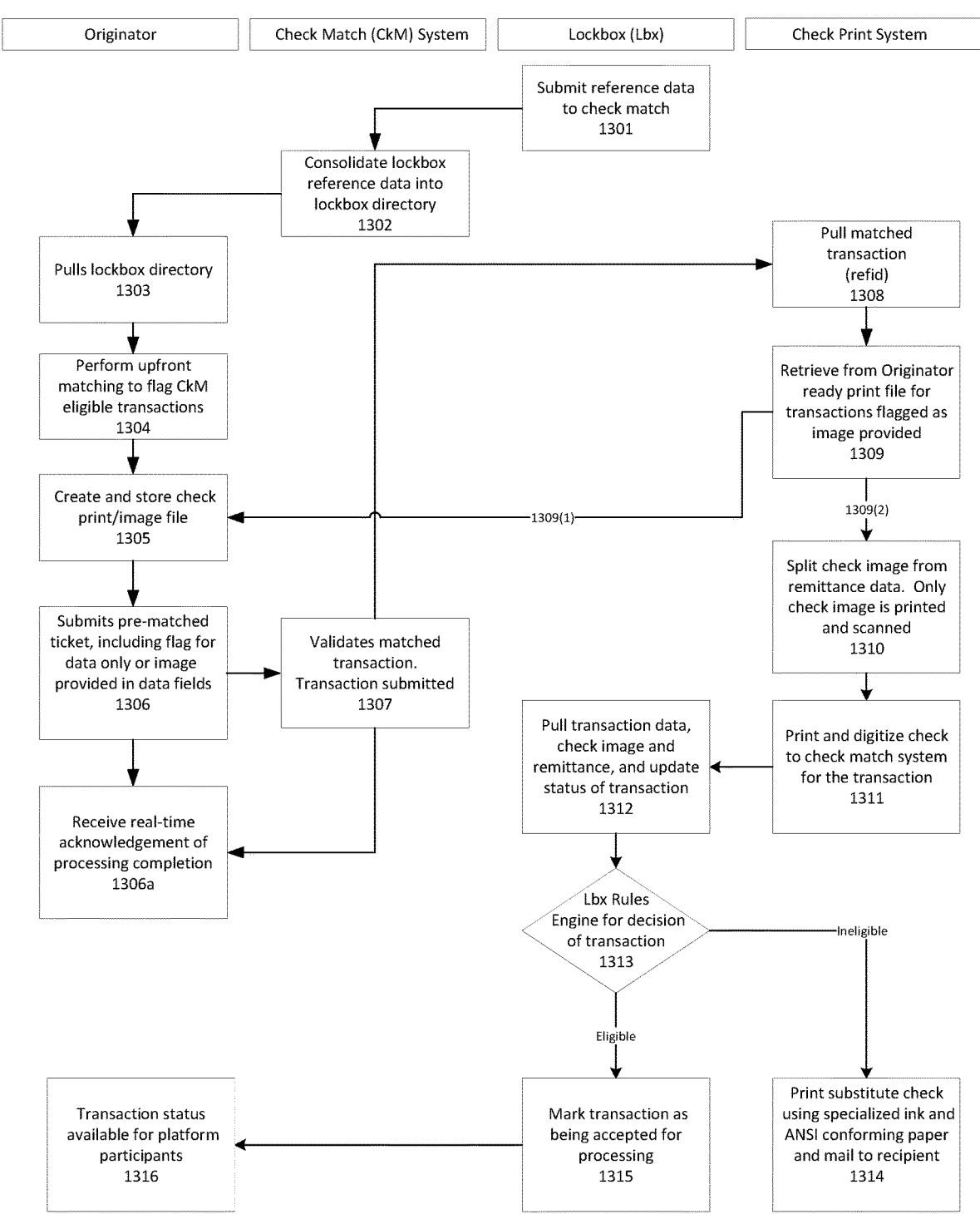
FIG. 13 is an exemplary process flow diagram for performing a digital transmission of both a paper check and associated remittance information with exception handling, according to an embodiment of the present invention.

FIG. 13 is an exemplary process flow diagram for performing a digital transmission of a paper check and associated remittance information with exception handling, according to an embodiment of the present invention.

As illustrated in FIG. 13, the system for performing the check matching process includes an originator system or device, a check match system, a lockbox system, and a check print system. According to exemplary aspects, the originator system may include one or more computing devices that may be utilized to initiate a paper check transaction. The check match system may include a server or network of servers configured to facilitate an exchange for electronically or digitally processing paper check transactions, whether they are for purposes of bill payment, payment disbursements, reimbursements and the like. According to exemplary aspects, the exchange may include an electronic exchange and a digital exchange. Although language of electronic processing or electronic exchange may be referenced, aspects of the present disclosure are not limited thereto, such that electronic processing or electronic exchange may include electronic and/or digital processing and electronic and/or digital exchange, respectively.

In an example, the check match system may have the same or a similar system configuration as the IIN. The check print system may be an internal system of printers for performing printing of checks. According to exemplary aspects, the check print system may include both (i) specialized check printers that may utilize specialized printer ink, such as magnetic ink character recognition (MICR) ink or toner, and/or ANSI conforming paper (e.g., at least 20-pound long grain with paper moisture content being between 4.7 to 5.5%) for printing of paper checks that may be durably be handled by mechanical sorters and recognized by commercial check readers, and (ii) ordinary printers that may utilize ordinary (i.e., non-MICR) printer ink and/or ordinary paper (i.e., non-ANSI conforming) for printing of check images, which may not be recognized by a commercial check reader and unable to withstand physical handling by mechanical sorters. In an example, the ordinary print ink may include carbon black ink, and non-ANSI conforming paper may include paper that does not include at least 20-pound long grain with paper moisture content being between 4.7 to 5.5%.

In step 1301, the lockbox system submits reference data to the check match system. According to exemplary aspects, reference data may include, without limitation, one or more of participant identifier, address, city, state, P.O. Box, zip code and the like. In an example, the reference data may be sent as a batch file, at regular intervals to include updates, and/or in real-time to reflect any changes to the reference data.

In step 1302, the check match system consolidates or otherwise combines the received lockbox reference data into a lockbox directory. According to exemplary aspects, the lockbox directory may be stored at the check match system. However, aspects of the present disclosure may not be limited thereto, such that the lockbox directory may be stored at another location or system.

In step 1303, the originator system pulls the lockbox directory from the check match system. In step 1304, the originator system performs upfront matching to flag check match system eligible transactions. For the ineligible transactions, such transactions may be handled by a traditional check printing process, which utilizes MICR ink or toner and ANSI conforming paper. For the eligible transactions, the process proceeds to step 1305.

In step 1305, a check print/image file or data may be created and stored for the check system eligible transactions. However, aspects of the disclosure are not limited thereto, such that the check print/image file or data may be stored in different formats.

In step 1306, the originator system submits the pre-matched transactions (i.e., check match system eligible transactions) to the check match system. According to exemplary aspects, one or more of the submitted pre-matched transactions may include a flag indicating whether if the respective transactions include data only or whether an image data or file (e.g., check image and remittance information, or a print file) is provided in the data fields.

In step 1307, the check match system validates the pre-matched transactions and updates a status for each of the pre-matched transactions. For example, the status for the pre-matched transaction may indicate that the transaction has been created. In response to the validation performed by the check match system, the check match system may further transmit real-time indication of validation processing completion to the originator system and the check print system.

In step 1306a, the originator system receives the real-time acknowledgement of validation completion from the check match system. Contemporaneously, the check print system acquires or pulls the matched transaction from the check match system in step 1308. Although the check print system is described as pulling the matched transaction, aspects of the present disclosure are not limited thereto, such that the match transactions may be pushed by the check match system to the check print system.

In step 1309(1) of step 1309, the check print system retrieves or receives from the originator system, the print/image file or data for transactions flagged as including the image data or file. In step 1309(2) of step 1309, the check print system further transmits the acquired print/image file or data to a component of the check print system for further processing. According to exemplary aspects, step 1309(1) may be performed contemporaneously with step 1309(2).

However, aspects of the present disclosure are not limited thereto, such that the step 1309(1) and step 1309(2) may be performed in sequence.

More specifically, in step 1310, the check print system performs further processing of the acquired print/image file or data for splitting check data from the remittance data. More specifically, the check print system identifies only the check data to be printed and subsequently scanned, whereas remittance data or files may be stored for further processing.

In step 1311, the check print system performs a printing operation for the acquired print/image file or data. According to exemplary aspects, the printing operation may be performed using any ordinary ink that is capable of printing and/or using ordinary (i.e., non-ANSI conforming) printing paper. More specifically, the printing operation may be performed using non-MICR ink that is conventionally required for processing of checks. In an example, the image file or data may include an image of a check. Once the image file or data is physically printed on a paper using ordinary ink, the paper printed image may then be scanned to capture an image of the printed image. At least since scanned image for electronic processing does not require specialized ink for processing of the scanned image, an ordinary printer may be utilized without any special equipment. Accordingly, printing operation of such transactional instruments (e.g., checks) may be more easily achieved without the requirement of any specialized equipment or materials thereby increasing scaling efficiencies of such processing.

In step 1312, the lockbox system pulls transaction data, scanned check image, and corresponding remittance data. Further, the lockbox system updates its status after pulling of such information. Although the lockbox system is described as pulling the above noted information, aspects of the present disclosure are not limited thereto, such that the check print system may push such information to be received by the lockbox system.

In step 1313, the lockbox system checks the information obtained in step 1312 against lockbox rules using the lockbox rules engine. According to exemplary aspects, the lockbox rules engine may determine that the obtained information including the scanned check image may be eligible or ineligible for digital processing or conveyance. If the obtained information including the scanned check image is determined to be eligible for digital processing or conveyance, the lockbox system marks the respective transaction as being accepted for processing in step 1315. Alternatively, if the obtained information including the scanned check image is determined to be ineligible for digital processing or conveyance, then a request to perform substitute check printing and mailing operation may be transmitted to the check print system in step 1314. According to exemplary aspects, the substitute check may be printed using specialized ink (e.g., MICR ink or toner) and specialized paper (e.g., ANSI conforming check print paper), and mailed to a respective recipient.

In step 1316, the accepted status for the digital processing or conveyance is communicated to the originator system for updating the status transaction, which may also be communicated or displayed to a participating paper check transaction originator or a participant of the originator system.

FIG. 14 is an exemplary system flow diagram illustrating a method for performing a digital remittance of a paper check and associated remittance information with exception handling, according to an embodiment of the present invention.

In step 1401, a lockbox (lbx) client submits reference data to a check match system. In step 1402, check match system consolidates the reference data into a lockbox directory. In step 1403, an originator client pulls or otherwise obtains the lockbox directory from the check match system. In step 1404, the originator client uses the lockbox directory to indicate and flag check match system eligible transactions (txs). In step 1405, the originator client will generate and store check and remittance image file. In step 1406, the originator client submits eligible transactions to the check match system differentiating between data only or including an image (data or field).

In step 1407, the check match system validates the transactions indicated as being eligible by the originator client, and creates a matched transaction. According to exemplary aspects, a matched transaction may be created using P.O. Box and Zip Code information. However, aspects are not limited thereto, such that the matched transactions may be created using other data fields or information.

In step 1408, the check match system rejects any transaction that are deemed ineligible for check match system processing, and accepts the remaining transactions as being eligible for digital processing or conveyance. According to exemplary aspects, the check match system ineligible transactions may include, without limitation, any transaction that fails validation, business rules, and/or check match matching operations. In step 1408(*a*), transactions not eligible for check match system processing are sent to the originator client for performing check printing operations. According to exemplary aspects, the originator client may perform the check printing operation itself or send the transaction to a check printing facility. The check match system ineligible transactions may be printed by a specialized check printing machine using MICR ink and ANSI standard conforming paper.

In step 1409, the check print system pulls matched or created transactions for digital processing or conveyance from the check match system. According to exemplary aspects, check print system may be a part of the check match system or may be a separate entity or system.

In step 1410, for transactions with image provided flag, the check print system calls its API to download the image file or data from the originator client.

In step 1411, the check print system splits the check image data or file from the remittance data. The separated remittance data is then stored for subsequent transmission while the check image data or file is printed. Once the check image data or file is printed, it is subsequently scanned to produce a scanned check image for performing digital processing or conveyance.

According to exemplary aspects, the printing step of step 1411 may be performed using any ordinary ink that is capable of printing and/or using ordinary (i.e., non-ANSI conforming) printing paper. More specifically, the printing operation may be performed using non-MICR ink that is conventionally required for processing of checks. In an example, the image file or data may include an image of a check. Once the image file or data is physically printed on a paper using ordinary ink, the paper printed image may then be scanned to capture an image of the printed image. At least since scanned image for electronic processing does not require specialized ink for processing of the scanned image, an ordinary printer may be utilized without any special equipment. Accordingly, printing operation of such transactional instruments (e.g., checks) may be more easily achieved without the requirement of any specialized equipment or materials thereby increasing scaling efficiencies of such processing.

In step 1412, the check system provider updates a status of the respective transaction to reflect the printed state of the check. In step 1413, the lockbox client pulls, or otherwise obtains, transaction data payload with the updated transaction status. In step 1414, the lockbox pulls, or otherwise obtains, check images using an identifier (e.g., reference ID or refID) of the transaction included in the transaction data. In step 1415, the lockbox client pulls remittance image file, which is separated from the printed check image file, using the identifier, such as the refID, of the transaction included in the transaction data. In step 1416, image collection receipt is then transmitted from the lockbox client to the check print system.

In step 1417, the lockbox client applies the lockbox rules engine to the transaction data payload acquired in step 1413 and the check images acquired in step 1414 to determine whether the corresponding transaction may be digitally processed or not. If the transaction is eligible to be digitally processed, the method proceeds to step 1418*a*, in which the lockbox client sends terminal transaction status. In an example, the transaction status may include, without limitation, post, bill pay, close, and the like. On the other hand, if the transaction is ineligible to be digitally processed, the method proceeds to step 1418*b*, in which the lockbox client requests the check print system to print and mail a paper check for the ineligible transaction. In response to such request, the check print system in step 1418*c* prints and mails the printed check or remittance to the corresponding recipient. According to exemplary aspects, the check printed in step 1418*b* may be printed using specialized ink (e.g., MICR ink or toner) and specialized paper (e.g., ANSI conforming check print paper), and mailed to the respective recipient.

Moreover, in step 1418*d*, the lockbox client may obtain the transaction by the status or the reference ID. In step 1418*e*, the check match system transmits a notification indicating that the terminal status is available to the original client. In step 1419, the original client pulls transaction terminal status from the check match system. In step 1419*a*, the original client obtains transaction recon by status and time zone.

Although all of the steps are illustrated in FIG. 14, one or more of step 1414, step 1416, step 1418*c*, step 1418*d* and 1419*a* may be optionally executed or omitted.

The foregoing examples show the various embodiments of the invention in one physical configuration; however, it is to be appreciated that the various components may be located at distant portions of a distributed network, such as a local area network, a wide area network, a telecommunications network, an intranet and/or the Internet. Thus, it should be appreciated that the components of the various embodiments may be combined into one or more devices, collocated on a particular node of a distributed network, or distributed at various locations in a network, for example. As will be appreciated by those skilled in the art, the components of the various embodiments may be arranged at any location or locations within a distributed network without affecting the operation of the respective system.

Those skilled in the art will appreciate that the system diagrams discussed above are merely examples of an electronic exchange system and are not intended to be limiting. Other types and configurations of networks, servers, databases, mobile devices, and personal computing devices (e.g., desktop computers, tablet computers, mobile computing devices, smart phones, etc.) may be used with exemplary embodiments of the invention. Although the foregoing examples show the various embodiments of the invention in one physical configuration; it is to be appreciated that the various components may be located at distant portions of a distributed network, such as a local area network, a wide area network, a telecommunications network, an intranet and/or the Internet. Thus, it should be appreciated that the components of the various embodiments may be combined into one or more devices, collocated on a particular node of a distributed network, or distributed at various locations in a network, for example. The components of the various embodiments may be arranged at any location or locations within a distributed network without affecting the operation of the respective system.

Data and information maintained by the servers and computing devices shown in FIG. 1 may be stored and cataloged in one or more databases, which may comprise or interface with a searchable database and/or a cloud database. The databases may comprise, include or interface to a relational database. Other databases, such as a query format database, a Standard Query Language (SQL) format database, a storage area network (SAN), or another similar data storage device, query format, platform or resource may be used. The databases may comprise a single database or a collection of databases. In some embodiments, the databases may comprise a file management system, program or application for storing and maintaining data and information used or generated by the various features and functions of the systems and methods described herein.

The communications networks in FIG. 1, may be comprised of, or may interface to any one or more of, for example, the Internet, an intranet, a Local Area Network (LAN), a Wide Area Network (WAN), a Metropolitan Area Network (MAN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a Digital Subscriber Line (DSL) connection, an Ethernet connection, an Integrated Services Digital Network (ISDN) line, an Asynchronous Transfer Mode (ATM) connection, a Fiber Distributed Data Interface (FDDI) connection, a Copper Distributed Data Interface (CDDI) connection, or an optical/DWDM network.

The communications networks in FIG. 1 may also comprise, include or interface to any one or more of a Wireless Application Protocol (WAP) link, a Wi-Fi link, a microwave link, a General Packet Radio Service (GPRS) link, a Global System for Mobile Communication (GSM) link, a Code Division Multiple Access (CDMA) link or a Time Division Multiple Access (TDMA) link such as a cellular phone channel, a Global Positioning System (GPS) link, a cellular digital packet data link, a Bluetooth radio link, or an IEEE 802.11-based radio frequency link. The communications network may further comprise, include or interface to any one or more of an RS-232 serial connection, an IEEE-1394 (Firewire) connection, a Fibre Channel connection, an infrared (IrDA) port, a Small Computer Systems Interface (SCSI) connection, a Universal Serial Bus (USB) connection or another wired or wireless, digital or analog interface or connection.

In some embodiments, the communication network may comprise a satellite communications network, such as a direct broadcast communication system (DBS) having the requisite number of dishes, satellites and transmitter/receiver boxes, for example. The communications network may also comprise a telephone communications network, such as the Public Switched Telephone Network (PSTN). In another embodiment, the communication network may comprise a Personal Branch Exchange (PBX), which may further connect to the PSTN.

As described above, FIG. 1 includes a number of computing devices, each of which may include at least one programmed processor and at least one memory or storage device. The memory may store a set of instructions. The instructions may be either permanently or temporarily stored in the memory or memories of the processor. The set of instructions may include various instructions that perform a particular task or tasks, such as those tasks described above. Such a set of instructions for performing a particular task may be characterized as a program, software program, software application, app, or software. The modules described above may comprise software, firmware, hardware, or a combination of the foregoing.

It is appreciated that in order to practice the methods of the embodiments as described above, it is not necessary that the processors and/or the memories be physically located in the same geographical place. That is, each of the processors and the memories used in exemplary embodiments of the invention may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two or more pieces of equipment in two or more different physical locations. The two distinct pieces of equipment may be connected in any suitable manner. Additionally, the memory may include two or more portions of memory in two or more physical locations.

As described above, a set of instructions is used in the processing of various embodiments of the invention. FIG. 1 may include software or computer programs stored in the memory (e.g., non-transitory computer readable medium containing program code instructions executed by the processor) for executing the methods described herein. The set of instructions may be in the form of a program or software or app. The software may be in the form of system software or application software, for example. The software might also be in the form of a collection of separate programs, a program module within a larger program, or a portion of a program module, for example. The software used might also include modular programming in the form of object oriented programming. The software tells the processor what to do with the data being processed.

Further, it is appreciated that the instructions or set of instructions used in the implementation and operation of the invention may be in a suitable form such that the processor may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processor, i.e., to a particular type of computer, for example. Any suitable programming language may be used in accordance with the various embodiments of the invention. For example, the programming language used may include assembly language, Ada, APL, Basic, C, C++, COBOL, dBase, Forth, Fortran, Java, Modula-2, Pascal, Prolog, REXX, Visual Basic, or JavaScript, or any other assembly language. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of various embodiments of the invention may utilize any compression or encryption technique or algorithm, as may be desired. An encryption module might be used to encrypt data. Further, files or other data may be decrypted using a suitable decryption module, for example.

In the system and method of exemplary embodiments of the invention, a variety of user interfaces may be utilized to allow a user to interface with the mobile devices or other personal computing device. As used herein, a user interface may include any hardware, software, or combination of hardware and software used by the processor that allows a user to interact with the processor of the communication device. A user interface may be in the form of a dialogue screen provided by an app, for example. A user interface may also include any of touch screen, keyboard, voice reader, voice recognizer, dialogue screen, menu box, list, checkbox, toggle switch, a pushbutton, a virtual environment (e.g., Virtual Machine (VM)/cloud), or any other device that allows a user to receive information regarding the operation of the processor as it processes a set of instructions and/or provide the processor with information. Accordingly, the user interface may be any system that provides communication between a user and a processor. The information provided by the user to the processor through the user interface may be in the form of a command, a selection of data, or some other input, for example.

The software, hardware and services described herein may be provided utilizing one or more cloud service models, such as Software-as-a-Service (SaaS), Platform-as-a-Service (PaaS), and Infrastructure-as-a-Service (IaaS), and/or using one or more deployment models such as public cloud, private cloud, hybrid cloud, and/or community cloud models.

Although, the examples above have been described primarily as using a software application ("app") downloaded onto the customer's mobile device, other embodiments of the invention can be implemented using similar technologies, such as transmission of data that is displayed using an existing web browser on the customer's mobile device.

Although the embodiments of the present invention have been described herein in the context of a particular implementation in a particular environment for a particular purpose, those skilled in the art will recognize that its usefulness is not limited thereto and that the embodiments of the present invention can be beneficially implemented in other related environments for similar purposes.

What is claimed is:

1. A system for implementing an exchange via an interbank information network (IIN) architecture for paper check transactions, the system comprising:
 a printer configured to print a paper check using ordinary ink that is not a magnetic ink character recognition (MICR) ink and ordinary printing paper that is not American National Standards Institute (ANSI) compliant;
 a scanner configured to scan the paper check printed by the printer for generating a print image file;
 a blockchain network comprising:

a bill pay blockchain node in communication with a paper check transaction platform associated with one or more paper check transaction originators, and
 a lockbox platform node in communication with a lockbox platform associated with one or more lockbox service providers; and
 a computer processor, coupled to the bill pay blockchain node and the lockbox platform node second electronic input, the computer processor executing an Interbank Information Network (IIN) application and is further configured to perform:
 receiving, via the bill pay blockchain node, data elements from the paper check transactions platform;
 receiving, via the lockbox platform node second electronic input, reference data elements from the lockbox platform;
 comparing, via the computer processor, the data elements and the reference data elements to identify one or more participants;
 identifying, via the computer processor, a first set of transactions that require printing and mailing of a check and a second set of transactions that require processing through an IIN;
 causing, via the computer processor and using the printer, printing of paper checks using the ordinary ink and the ordinary printing paper for the second set of transactions;
 causing, via the computer processor and using the scanner, scanning of the paper checks printed for the second set of transactions for generating print image files for the second set of transactions;
 transmitting, via the computer processor, a corresponding payment file for the second set of transactions to a centralized lockbox deposit account, wherein the corresponding payment file includes the print image files for the second set of transactions; and
 transmitting, via the computer processor, a lockbox file to the one or more participants via the lockbox platform.

2. The system according to claim 1, wherein the corresponding payment file comprise an Automated Clearing House (ACH) file.

3. The system according to claim 1, wherein the reference data elements comprise biller data.

4. The system according to claim 1, wherein the data elements comprise a transaction file from a paper check transaction originator.

5. The system according to claim 1, wherein the comparing is based on a unique identifier shared by the reference data elements and the data elements.

6. The system according to claim 1, wherein the comparing is based on biller address data.

7. The system according to claim 1, wherein the one or more participants are participants of the IIN.

8. The system according to claim 1, wherein transaction data is distributed based on one or more lockbox rules.

9. The system according to claim 1, wherein the computer processor is further configured to perform the step of: publishing transaction data to a distributed ledger.

10. The system according to claim 9, wherein the distributed ledger comprises built-in entitlements for restricted access.

11. The system according to claim 1, wherein the data elements include data elements from the one or more paper check transaction originators.

12. The system according to claim 11, wherein the data elements from the one or more paper check transaction originators include at least check fields, transactions details, and related remittance information in any format the one or more paper check transaction originators provides.

13. The system according to claim 1, further comprising another printer equipped with MICR ink and configured to print a check image file for at least one paper check transaction included in the second set of transactions, wherein the other printer is further equipped with ANSI compliant check printing paper, and wherein the ANSI requires that the check printing paper is composed of at least 20-pound long grain with paper moisture content being between 4.7 to 5.5%.

14. The system according to claim 1, wherein the printer is equipped with non-MICR carbon black ink and configured to print a check image file for at least one paper check transaction included in the second set of transactions.

15. The system according to claim 14, wherein the ANSI requires that the check printing paper is composed of at least 20-pound long grain with paper moisture content being between 4.7 to 5.5%.

16. The system according to claim 1, wherein the transmitting of the corresponding payment file for the second set of transactions includes transmitting a scanned check image as the print image file and remittance information, and wherein the remittance information is saved and the scanned check image is printed and subsequently scanned.

17. The system according to claim 16, wherein the computer processor in receipt of the transmitted payment file, determines whether the payment file is capable of digital conveyance or not based on the remittance information.

18. The system according to claim 17, wherein, when the payment file is capable of digital conveyance, digitally convey the scanned check image for fulfilling at least one paper check transaction, and when the payment file is determined to be incapable of digital conveyance, causing another printer to print a substitute check using the scanned check image and with MICR ink, and sending, via physical mail, the printed substitute check to a recipient indicated by the remittance information.

19. The system according to claim 1, wherein the reference data elements include directory data of the one or more lockbox service providers.

20. A method for implementing an exchange via an interbank information network (IIN) architecture for paper check transactions, the method comprising the steps of:

receiving, via a bill pay blockchain node, data elements from a paper check transactions platform, wherein the bill pay blockchain node is in communication with the paper check transactions platform associated with one or more paper check transaction originators;

receiving, via a lockbox platform node, reference data elements from a lockbox platform, wherein the lockbox platform node is in communication with the lockbox platform associated with one or more lockbox service providers;

comparing, via a computer processor, the data elements and the reference data elements to identify one or more participants, wherein the computer processor is coupled to the bill pay blockchain node and the lockbox platform node and executes an Interbank Information Network (IIN) application;

identifying, via the computer processor, a first set of transactions that require printing and mailing of a check and a second set of transactions that require processing through an Interbank Information Network (IIN);

printing, via a printer, paper checks using ordinary ink and ordinary paper for the second set of transactions, wherein the printer is configured to print a paper check using the ordinary ink that is not a magnetic ink character recognition (MICR) ink and the ordinary printing paper that is not American National Standards Institute (ANSI) compliant;

scanning, via a scanner, the paper checks printed by the printer for the second set of transactions for generating print image files for the second set of transactions;

transmitting, via the computer processor, a corresponding payment file for the second set of transactions to a centralized lockbox deposit account, wherein the corresponding payment file includes the print image files for the second set of transactions; and transmitting, via the computer processor, a lockbox file to the one or more participants via the lockbox platform.

* * * * *